US009177250B2

(12) United States Patent
Zadka et al.

(10) Patent No.: US 9,177,250 B2
(45) Date of Patent: Nov. 3, 2015

(54) METHOD AND SYSTEM FOR DETERMINING CONFIGURATION RULES BASED ON CONFIGURATIONS OF COMPLEX SYSTEMS

(71) Applicant: VMware, Inc., Palo Alto, CA (US)

(72) Inventors: Moshe Zadka, San Mateo, CA (US); Ryan Abrams, Palo Alto, CA (US); Andrew Nguyen, Irvine, CA (US)

(73) Assignee: VMware, Inc., Palo Alto, CA (US)

( * ) Notice: Subject to any disclaimer, the term of this patent is extended or adjusted under 35 U.S.C. 154(b) by 186 days.

(21) Appl. No.: 13/931,685

(22) Filed: Jun. 28, 2013

(65) Prior Publication Data

US 2015/0006458 A1 Jan. 1, 2015

(51) Int. Cl.
*G06N 5/02* (2006.01)

(52) U.S. Cl.
CPC .................................... *G06N 5/022* (2013.01)

(58) Field of Classification Search
None
See application file for complete search history.

(56) References Cited

U.S. PATENT DOCUMENTS

| | | | | |
|---|---|---|---|---|
| 6,381,619 | B1 * | 4/2002 | Borowsky et al. | 711/170 |
| 6,430,736 | B1 * | 8/2002 | Levi et al. | 716/117 |
| 8,438,558 | B1 * | 5/2013 | Adams | 717/170 |
| 2003/0051026 | A1 * | 3/2003 | Carter et al. | 709/224 |
| 2004/0260813 | A1 * | 12/2004 | Heisserman et al. | 709/226 |
| 2005/0060391 | A1 * | 3/2005 | Kaminsky et al. | 709/220 |
| 2007/0112824 | A1 * | 5/2007 | Lock et al. | 707/102 |
| 2009/0187525 | A1 * | 7/2009 | Agrawal et al. | 706/50 |
| 2009/0248597 | A1 * | 10/2009 | Fickie et al. | 706/13 |
| 2010/0005051 | A1 * | 1/2010 | Agrawal et al. | 706/55 |
| 2010/0106714 | A1 * | 4/2010 | Lim et al. | 707/718 |
| 2011/0019715 | A1 * | 1/2011 | Brisebois | 375/130 |
| 2012/0100842 | A1 * | 4/2012 | Ashraf et al. | 455/418 |
| 2014/0177476 | A1 * | 6/2014 | Perrett | 370/255 |

OTHER PUBLICATIONS

Weaver et al, Using Hierarchal Change Mining to Manage Network Security Policy Evolution, 2011.*

Wu et al, A Genetic Algorithm Based Approach to Optimal Fixture Configuration, 1996.*

* cited by examiner

*Primary Examiner* — Jeffrey A Gaffin
*Assistant Examiner* — Mikayla Chubb

(57) ABSTRACT

The current document discloses an automated method and system for inferring the logical rules underlying the configuration and versioning state of the components and subcomponents of a complex system, including data centers and other complex computational environments. The methods and systems employ a database of configuration information and construct an initial set of logical rules, or hypotheses, regarding system configuration. Then, using simulated annealing and a variant of genetic programming, the methods and systems disclosed in the current document carry out a search through the hypothesis state space for the system under several constrains in order to find one or more hypotheses that best explain the configuration and, when available, configuration history. The constraints include minimization of the complexity of the hypotheses and maximizing the accuracy by which the hypotheses predict observed configuration and configuration history.

20 Claims, 33 Drawing Sheets

```
{
    "center": {
        "snap 1": {
            "date": "May 30, 2013",
            "time": "13:23:04",
            "data": {
                "location 1": {
                    "server enclosure 1": {                              806
802                     "manufacturer": "Acme",
                        "type": "EX-10",                                 808
                        "version": "1.15.02"                             810
                        "components": {
812                         "blade server 1": {
814                             "manufacturer": "General Server, Inc.",
                                "type": "Power Blade II",
                                "version": "3.67.15.a",
                                "components": {
                                    "processor 1": {
                                        "manufacturer": "Reliable Semi, Inc.",
                                        "type": "XR-Delta III",
                                        "version": "1.00.03"
                                    },
                                    "processor 2": {
                                        "manufacturer": "Reliable Semi, Inc.",
                                        "type": "XR-Delta III",
                                        "version": "1.00.03"
                                    },
                                    "processor 3": {
                                        "manufacturer": "Reliable Semi, Inc.",
                                        "type": "XR-Delta III",
                                        "version": "1.00.03"
                                    },
                                    "processor 4": {
                                        "manufacturer": "Reliable Semi, Inc.",
                                        "type": "XR-Delta III",
                                        "version": "1.00.03"
                                    },
                                    "disk 1": {
                                        "manufacturer": "StunDsk",
                                        "type": "TerraDK",
                                        "version": "4.10.00"
                                    },
                                    "disk 2": {
                                        "manufacturer": "BigByte",
                                        "type": "BB-HC",
                                        "version": "2.70.5"
                                    },
```

FIG. 8A relational operators: >, <, <=, >=, =, != 1002 numeric operators: +, -, ∗, /, % 1004 built-in function: in (setName, element) 1006 add (listName, element)

logical operators: 1008

- ¬ not
- ∧ and
- ∨ or
- ∀ for all
- ∃ there exists
- = identity
- → implication built-in rules: ∀X component (X) → X < A,B,C,D> ∧ 1010 1014 1016 1012

X in components ∧ 1018

A in targets ∧

B in manufacturers ∧

E in B.products ∧

E <F,G>∧

A = F∧

G <H,J> ∧

C = H ∧

D in I.

FIG. 10 configuration rule :

∀X latestVersion (X) → X < A,B,C,D > ∧
E in B.products ∧
E < F,G > ∧
G < H,J > ∧
D = tail (I). } 1104 } 1102

¬∃X component (X) ∧ ¬ latestVersion (X). } 1106 configuration rule :

c1.version = '2.63.01' ∧
c2.version = '4.00.00' ∧
c3.version = '3.01.00' ∧
⋮
c20006 = '3.00.00'. } 1108

FIG. 11

2518 Premise: Configuration is at least 90% in accordance with a configuration hypothesis *H*.

2520 Assumption: *P* (component *a* in accordance with *H*) is independent of *P* (component *b* in accordance with *H*) when $a \neq b$.

METHOD AND SYSTEM FOR DETERMINING CONFIGURATION RULES BASED ON CONFIGURATIONS OF COMPLEX SYSTEMS

TECHNICAL FIELD

The current document is directed to automated inference engines and automated optimization and state-space searching, configuration management of complex systems, and, in particular, to a method and system for inferring configuration rules from complex-system configuration data.

BACKGROUND

As the data-storage capacities, computational bandwidths, data-transfer bandwidths, and other characteristics of computer systems have geometrically increased during the past 60 years, and as computer systems and processor-control devices have inexorably permeated and come to dominate many different areas of human activity as well as provided the foundation for many new types of human activity, including electronic commerce and electronic social networking, the complexity of computer systems has also geometrically increased. While early computers featured a single processor, very small, dedicated data-storage components, and primitive input/output devices, modern computer systems may comprise thousands or more processors within hundreds or more discrete computer systems distributed over geographical areas and interconnected by high-speed electronic communications connections. While early computer systems were capable of running only a single program, at any given point in time, even modern personal computers may store the data and instructions for tens, hundreds, or even thousands of different programs, a large number of which may be running at any given point in time. Early computer systems lacked even basic operating systems, while modern computers often feature virtualization layers, multiple operating systems, many specialized applications, and many other types of programs and utilities.

The configuration, management, and administration of large, complex modern computer systems has, as a result of the increasing complexity of modern computer systems, become a separate field in computer science and an important and ongoing undertaking within organizations that deploy and maintain computer systems, including data centers, cloud-computing facilities, and networked personal computers and servers that together provide computational facilities for employees within various types of organizations. In general, in modern computer systems, the components and subcomponents of a computer system, including firmware components, hardware components, and software components, are associated with various types of identifying information, including a version number. Generally, during the period of time over which a type of product is manufactured and sold, the product is revised and updated at various points in time, with each new revision and major update associated with a new version number. Often, the version numbers are multipart version identifiers that identify the major version and one or more additional levels of subordinate versions. One part of the configuration and administration tasks associated with complex systems is to ensure that components of the complex systems are updated according to various rules, procedures, policies, and schedules. As one example, software applications and operating systems are frequently updated through distribution of various patches produced by ongoing bug detection and amelioration efforts carried out by operating-system vendors. Administration of the system may involve formulating various procedures and rules, such as a rule that each operating system within one or more discrete computer systems within a complex, distributed computing environment must be updated to the most current available major version of the operating system and to within three versions of a latest subordinate version, such as subordinate versions corresponding to minor feature-and-function updates.

Unfortunately, while the various rules, procedures, policies, and schedules for carrying out updates to, and replacement of, components of a complex system are often rationally devised and well understood by certain individuals within an organization, they may be easily lost due to personnel changes and reassignments or become obscured, over time, as the complex systems grow and change and additional administrators are assigned to their administration. In many cases, including cases in which complex systems are virtualized for running within virtual data centers, acquired by new management groups or organizations, or operationally moved to different physical facilities, it may become necessary to determine and clearly specify the various procedures, rules, policies, and schedules that underlie the current configuration and, when available, the configuration history of a complex system. Currently, only imperfect methods and techniques are available for recovering information about the rules, procedures, policies, and schedules that define system configurations and that steer system administration. These methods include interviewing those who developed the rules, procedures, policies, and schedules and those who have used the rules, procedures, and schedules to configure and maintain a system and attempting to infer the rules, procedures, policies, and schedules from incomplete written records. The current document is directed to an automated system for inferring the logical rules underlying the configuration and version management within complex systems using information about the current configuration of the complex system as well as historical configuration information, when available.

SUMMARY

The current document discloses an automated method and system for inferring the logical rules underlying the configuration and versioning state of the components and subcomponents of a complex system, including data centers and other complex computational environments. The methods and systems employ a database of configuration information and construct an initial set of logical rules, or hypotheses, regarding system configuration. Then, using simulated annealing and a variant of genetic programming, the methods and systems disclosed in the current document carry out a search through the hypothesis state space for the system under several constrains in order to find one or more hypotheses that best explain the configuration and, when available, configuration history. The constraints include minimization of the complexity of the hypotheses and maximizing the accuracy by which the hypotheses predict observed configuration and configuration history.

BRIEF DESCRIPTION OF THE DRAWINGS

FIGS. 8A-B show a portion of a JSON encoding of the configuration of the data center illustrated in FIGS. 3-4, the configuration of which is described by the tree-like configuration hierarchy shown in FIG. 5A.

FIG. 10 illustrates the various types of operator elements of the simple hypothesis language.

FIG. 11 shows two different possible configuration rules.

DETAILED DESCRIPTION

The current document is directed towards inferring the logical rules underpinning the configuration of a complex system, such as a complex, distributed computing system or data center. The configuration of the complex system may include a current configuration and may additionally include historical configuration data, such as the configurations at particular points in time prior to the current time. While the current document discusses a particular method and system for interring the logical rules for the versions maintained for components of a complex system, the method and system may be easily applied to more complex configuration-rule inferencing, including determining not only the version, but other parameters for system components, including brand, type, size or capacity, and other such parameters. As another example, the inferencing methods and systems disclosed in the current document could be applied to determining rules by which complex systems grow and evolve, to predict future needs and procurement patterns regarding system maintenance and evolution.

It should be noted, at the onset, that the currently disclosed methods carry out real-world operations on physical systems and the currently disclosed systems are real-world physical systems. Implementations of the currently disclosed subject matter may, in part, include computer instructions that are stored on physical data-storage media and that are executed by one or more processors in order to infer configuration rules from physically stored configuration data. These stored computer instructions are neither abstract nor fairly characterized as "software only" or "merely software." They are control components of the systems to which the current document is directed that are no less physical than processors, sensors, and other physical devices.

Overview of Computer Systems and Representations of Computer System

Figure 1:
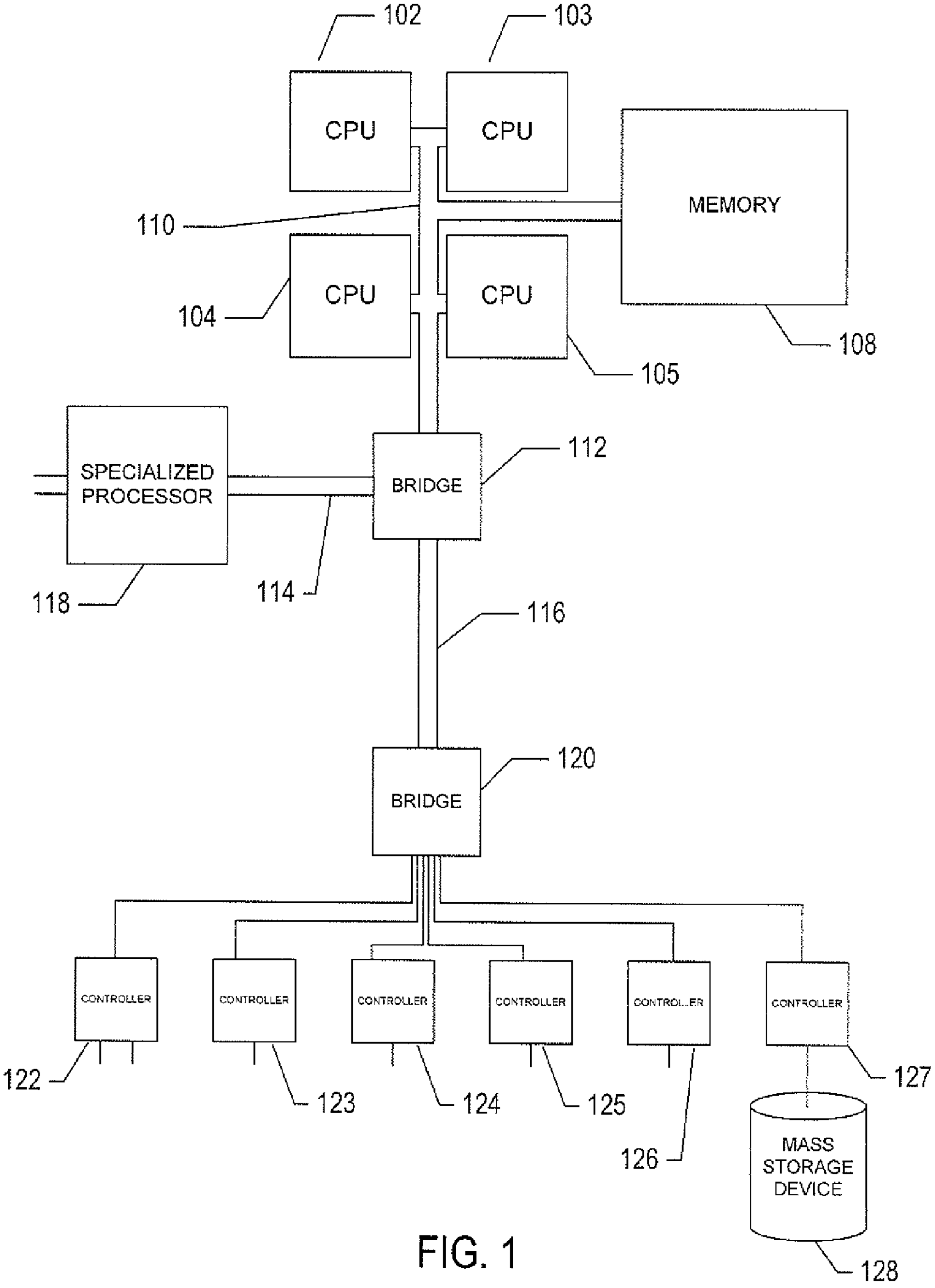
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2A:
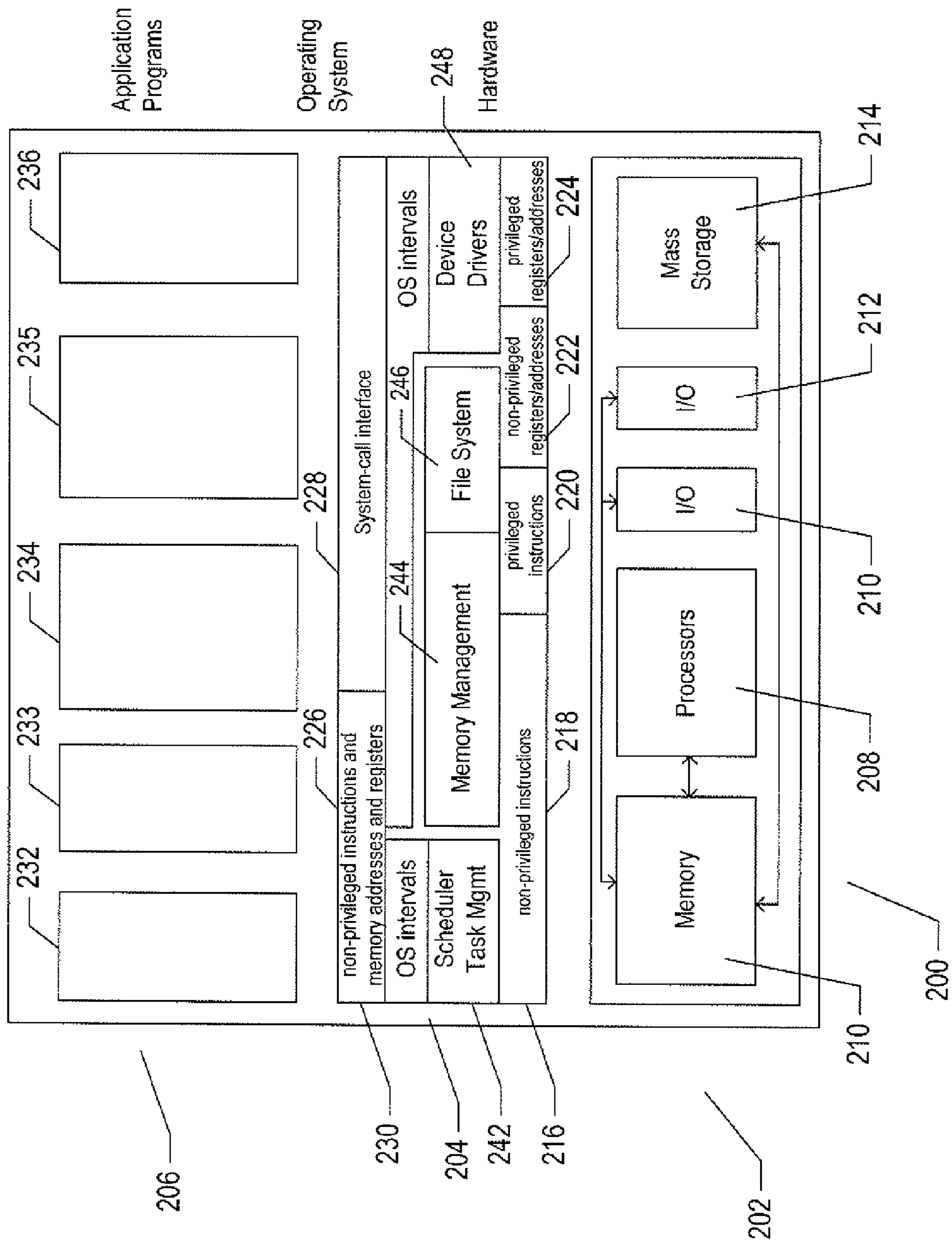
FIG. 2A illustrates generalized hardware and software components of a general-purpose compute system, such as a general-purpose computer system having an architecture similar to that shown in FIG. 1.

FIG. 2A illustrates generalized hardware and software components of a general-purpose compute system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 236 facilitates abstraction of mass-storage-device and memory resources as a high-level, easy-to-access, file-system interface.

Figure 2B:
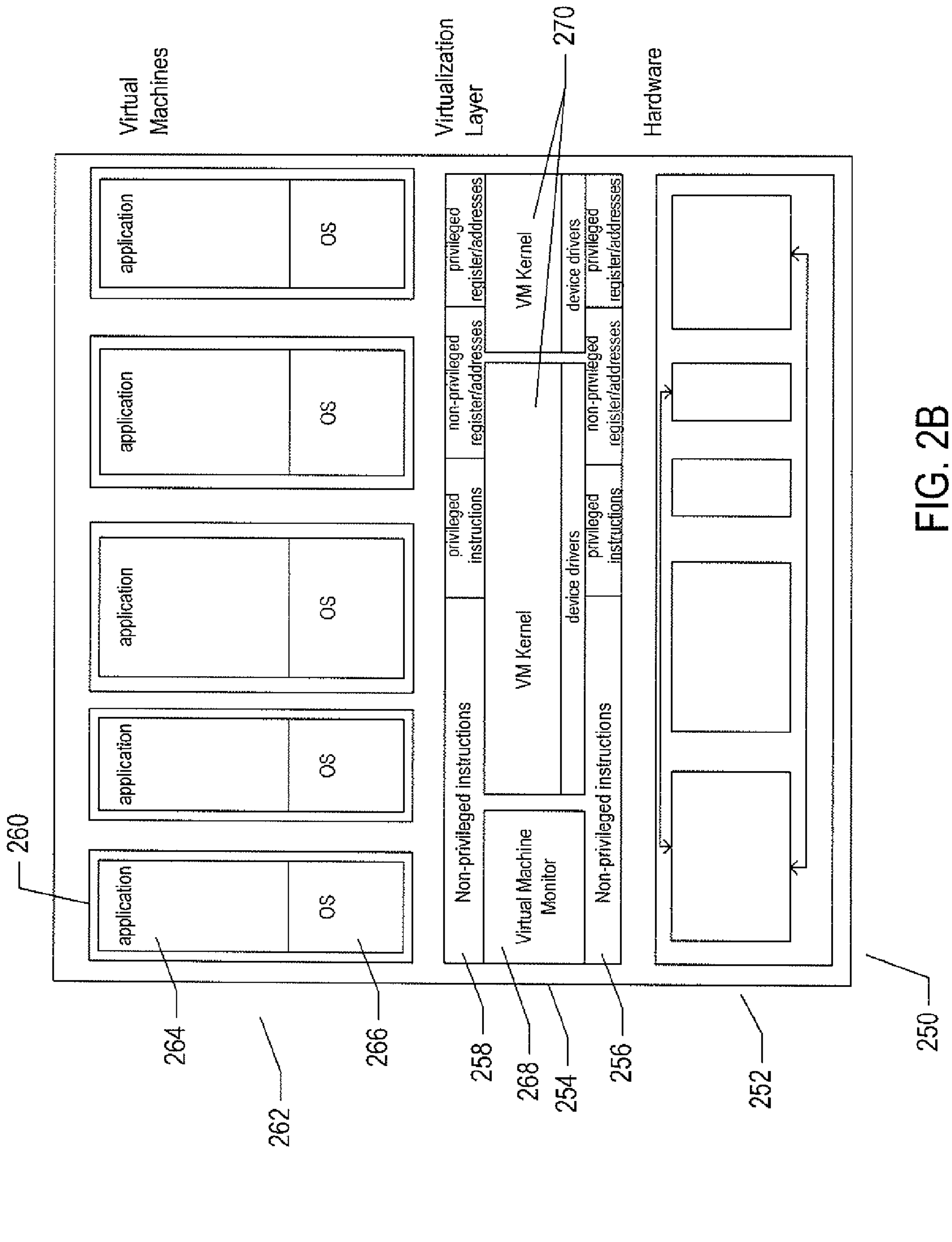
FIG. 2B illustrates one type of virtual machine and virtual-machine execution environment.

For many reasons, a higher level of abstraction, referred to as the "virtual machine," has been developed and evolved to further abstract computer hardware in order to address many difficulties and challenges associated with traditional computing systems, including the compatibility issues discussed above. FIG. 2B illustrates one type of virtual machine and virtual-machine execution environment. FIG. 2B uses the same illustration conventions as used in FIG. 2A. In particular, the computer system 250 in FIG. 2B includes the same hardware layer 252 as the hardware layer 202 shown in FIG. 2A. However, rather than providing an operating system layer directly above the hardware layer, as in FIG. 2A, the virtualized computing environment illustrated in FIG. 2B features a virtualization layer 254 that interfaces through a virtualization-layer/hardware-layer interface 256, equivalent to interface 216 in FIG. 2A, to the hardware. The virtualization layer provides a hardware-like interface 258 to a number of virtual machines, such as virtual machine 260, executing above the virtualization layer in a virtual-machine layer 262. Each virtual machine includes one or more application programs or other higher-level computational entities packaged together with an operating system, such as application 264 and operating system 266 packaged together within virtual machine 260. Each virtual machine is thus equivalent to the operating-system layer 204 and application-program layer 206 in the general-purpose computer system shown in FIG. 2A. Each operating system within a virtual machine interfaces to the virtualization-layer interface 258 rather than to the actual hardware interface 256. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 258 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 268 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 258, the accesses result in execution of virtualization-layer code to simulate or emulate the privileged resources. The virtualization layer additionally includes a kernel module 270 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 3:
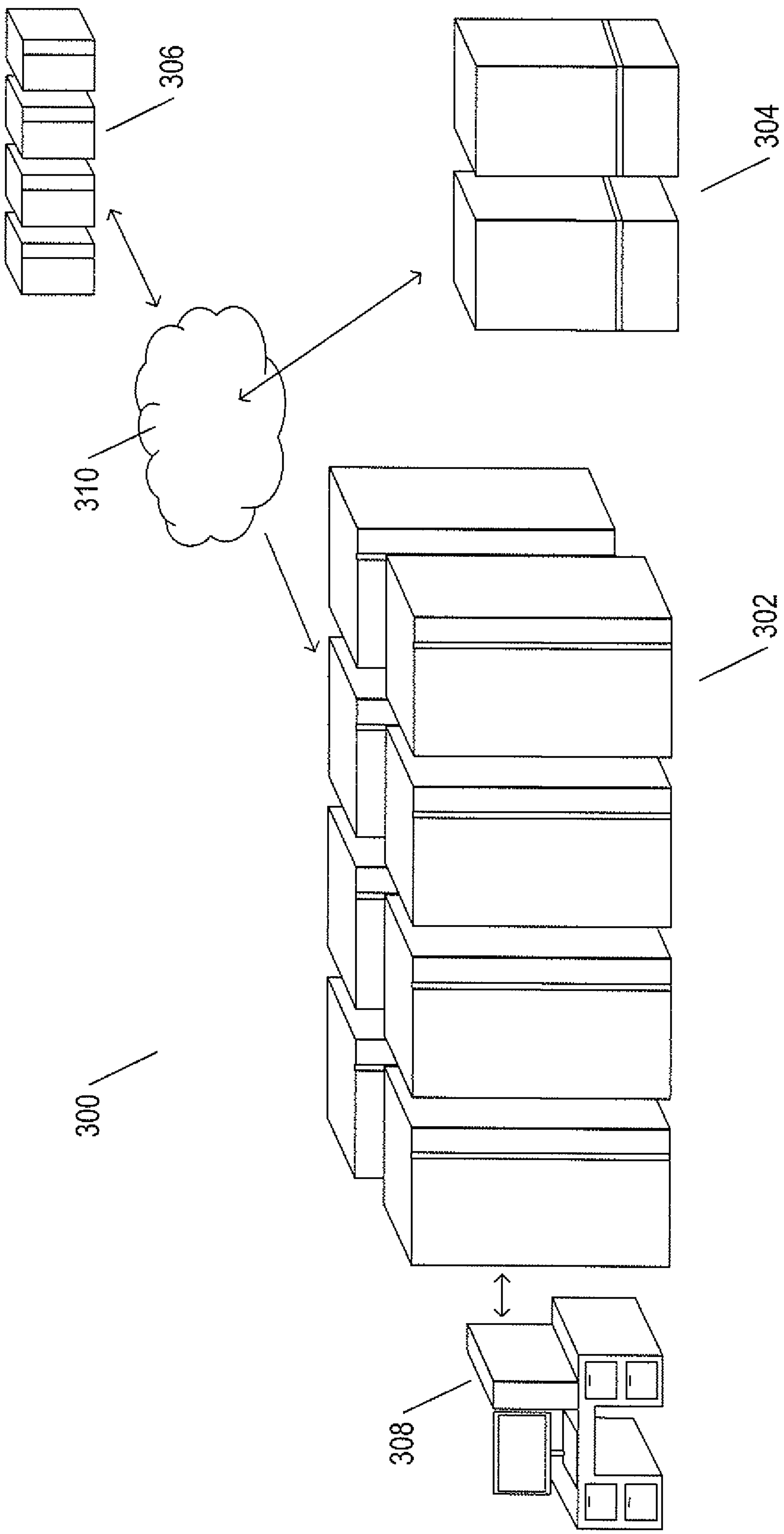
FIG. 3 illustrates an example data center.

FIG. 3 illustrates an example data center. The data center includes numerous component enclosures, such as component enclosure 302, each containing many server computers, data-storage subsystems, such as data-storing subsystem 304, various remote servers, data-storage subsystems, and other systems 306, and a local console computer 308. All of these various systems and subsystems are interconnected by local and wide-area networks, represented as cloud 310. At a highest level, the data center 300 consists of a set of local components, including components 302, 304, 308, and a set of remote components 306. At a next highest level, each of the sets of local components and remote components include discrete systems, such as a console computer 308, multiple server enclosures 302, and data-storage systems 304.

Figure 4:
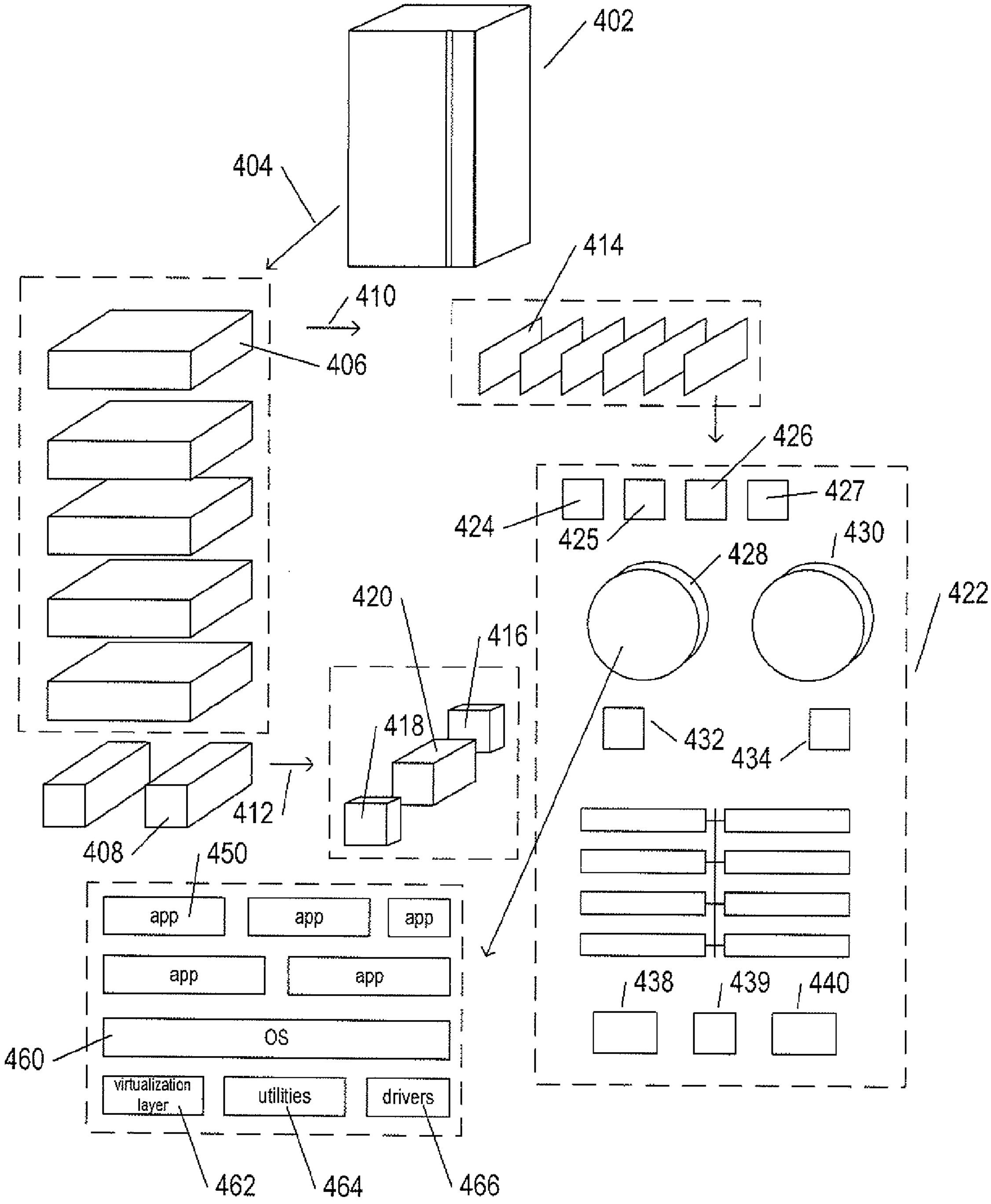
FIG. 4 illustrates numerous levels of components and subcomponents within a server enclosure.

FIG. 4 illustrates numerous levels of components and subcomponents within a server enclosure. The server enclosure 402 is a second-level component of the data center shown in FIG. 3 (302 in FIG. 3). Within the server enclosure, at a next-lower level of a component hierarchy, represented by arrow 404, there are multiple blade racks, such as blade rack 406 and several large power supplies, including power supply 408. These components, at a next-hierarchical level represented by arrows 410 and 412, include multiple blade servers, such as blade server 414 within blade rack 406 and, in the case of power supply 408, several fan modules 416 and 418 that cool a digital power supply 420. The fan modules 416 and 418 and digital power supply 420 can be further dissembled into many additional layers of components within the component hierarchy, not shown in FIG. 4. Each blade server, such as blade server 414, at a next level within the component hierarchy, can be understood to consist of a blade-server board 422 to which a number of processors 424-427, several disks 428 and 430, several disk controllers 432 and 434, a large RAM memory 436, and various other microprocessor-based components 438-440 are mounted, along with many additional signal lines, data paths, and smaller subcomponents. The contents of each disk can further be described as various different groups of stored instructions that represent multiple application programs, such as application program 450, at least one operating system, such as operating system 460, a virtualization layer, such as virtualization layer 462, and various utilities and drivers, such as the block of utilities 464 and set of drivers 466.

FIGS. 3 and 4 are meant to illustrate only a very few of the layers of components and subcomponents in a component hierarchy and only a very few components and subcomponents in each layer. Depending on the level to which one descends in analyzing a component hierarchy, any particular discrete system, such as the server enclosure 402, within a data center may have thousands, tens of thousands, or more components.

Figures 5A, 5B:
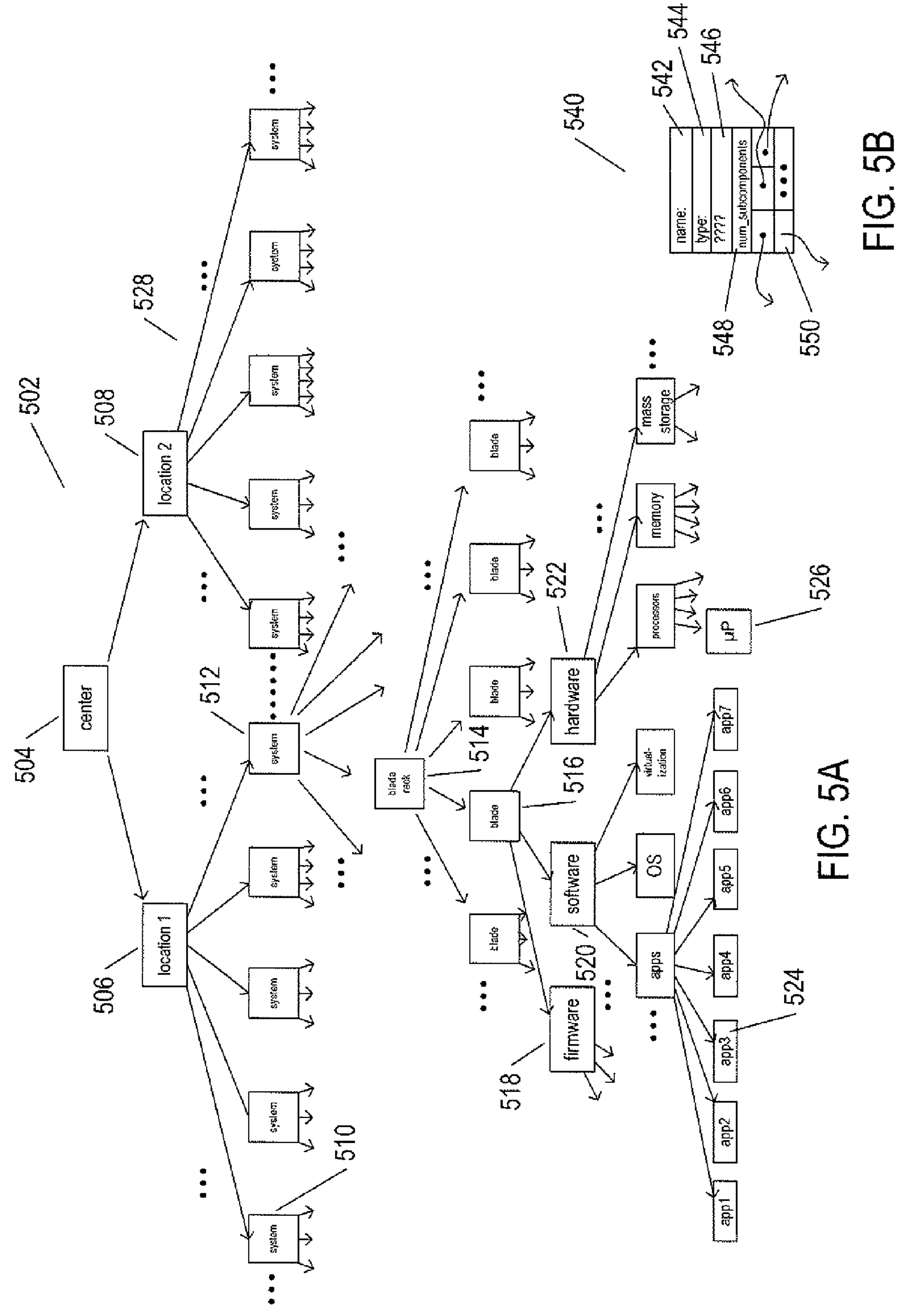
FIGS. 5A-B illustrate, using a tree-like diagram, the component hierarchy discussed above with reference to FIGS. 3 and 4.

FIGS. 5A-B illustrate, using a tree-like diagram, the component hierarchy discussed above with reference to FIGS. 3 and 4. The component hierarchy tree 502 includes a root node 504 that represents the entire data center, two next-level nodes 506 and 508 that represent the local portion of the data center (302, 304, and 308 in FIG. 3) and the remote portion of the data center (306 in FIG. 3), respectively, and numerous third-level nodes, such as node 510, that represent discrete systems within the local and remote portions of the data center. Node 512 represents a server enclosure that includes multiple subcomponents, including a blade rack represented by node 514 which, in turn, includes multiple blade components, such as blade component 516. Each blade component, such as blade component 516, includes firmware 518, software 520, and hardware 522, each of which are general categories that include a large number of subcomponents, including various application programs, such as application program 524, various processors, including a processor represented by node 526, and many other components. Thus, the full component hierarchy for a server enclosure would be an extremely large tree with many thousands or more nodes. Note that, in FIG. 5A, the ellipses, such as ellipses 528, represent additional links and subtrees.

FIG. 5B illustrates the contents of a node for those nodes in the component hierarchy 502 that represent discrete components. The node 540 includes various fields, including a name field 542, a type field 544, a version field 546, a field indicating the number of subcomponents of the component 548, and various references to subcomponents, such as the reference 550. Thus, for example, each blade in a blade rack may be described by a node such as node 540 shown in FIG. 5B, while other category-representing nodes, such as nodes 504, 506, 508, 518, 520, and 522, may be described by other types of node data structures that lack type and version fields. In many cases, the node data structure 540 may include many additional fields, including fields that describe the manufacturer of the component, fields that describe the installation date of the component, and many other types of fields containing other similar types of information potentially useful for configuration, maintenance, and administration.

Figure 6:
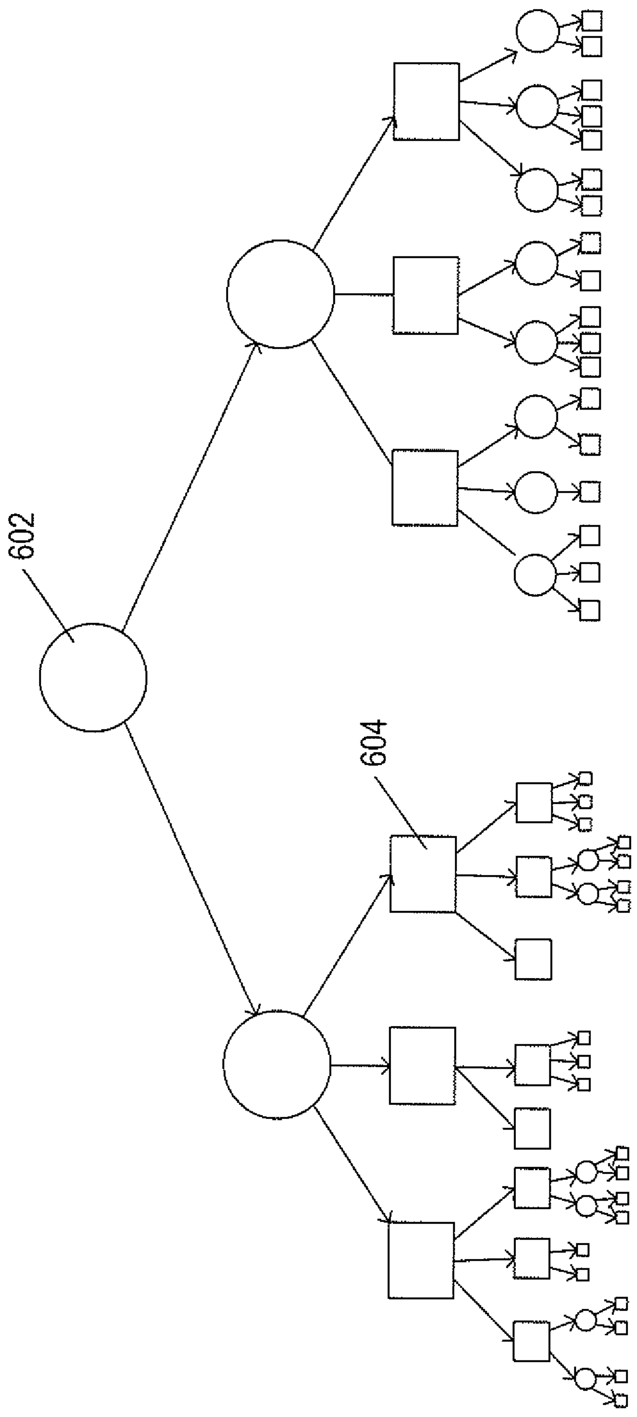
FIG. 6 is a simple component hierarchy for a simple system.
Figure 7:
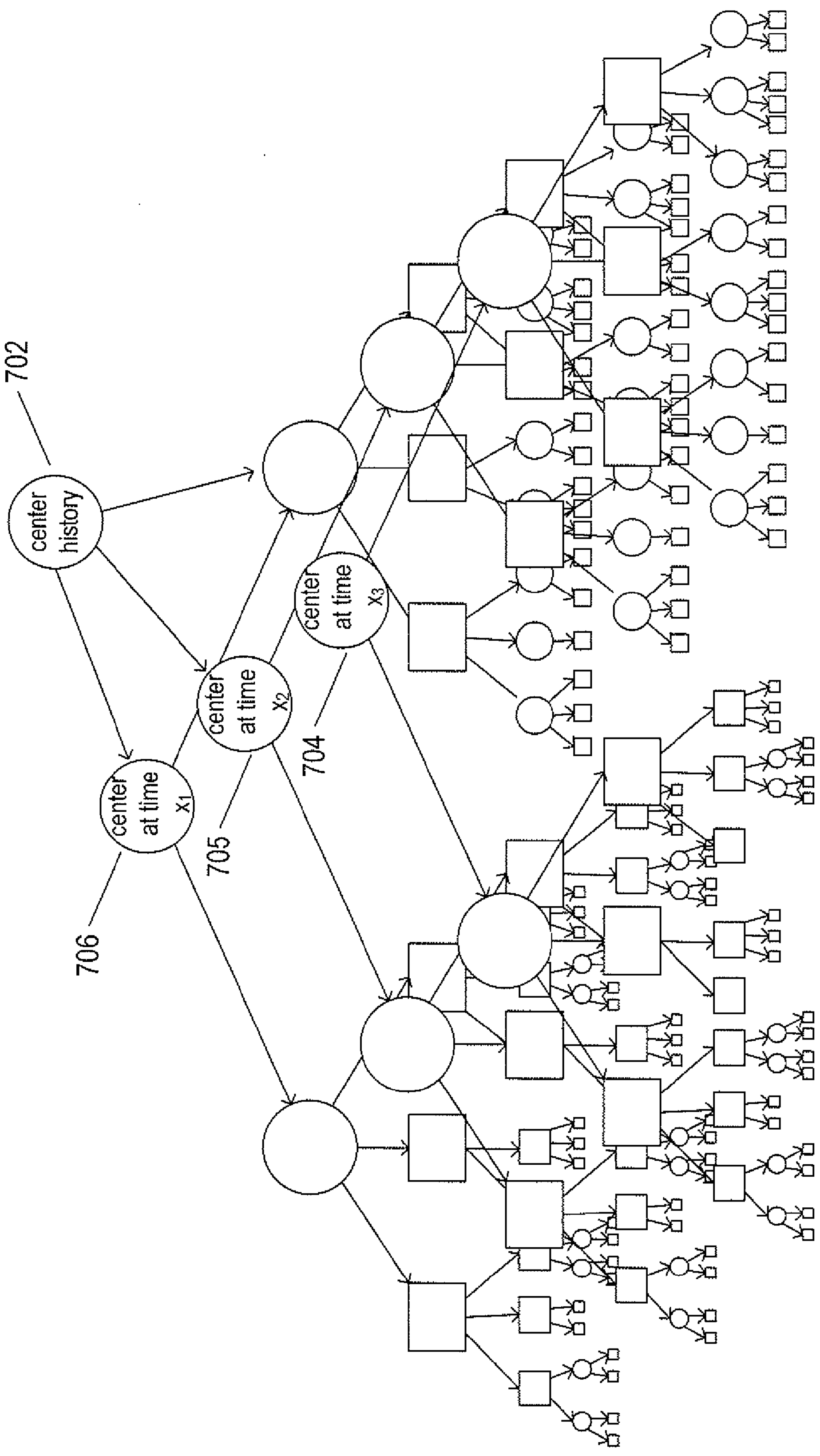
FIG. 7 shows a time sequence of component hierarchies that describe the configuration of a simple data center.
Figure 8B:
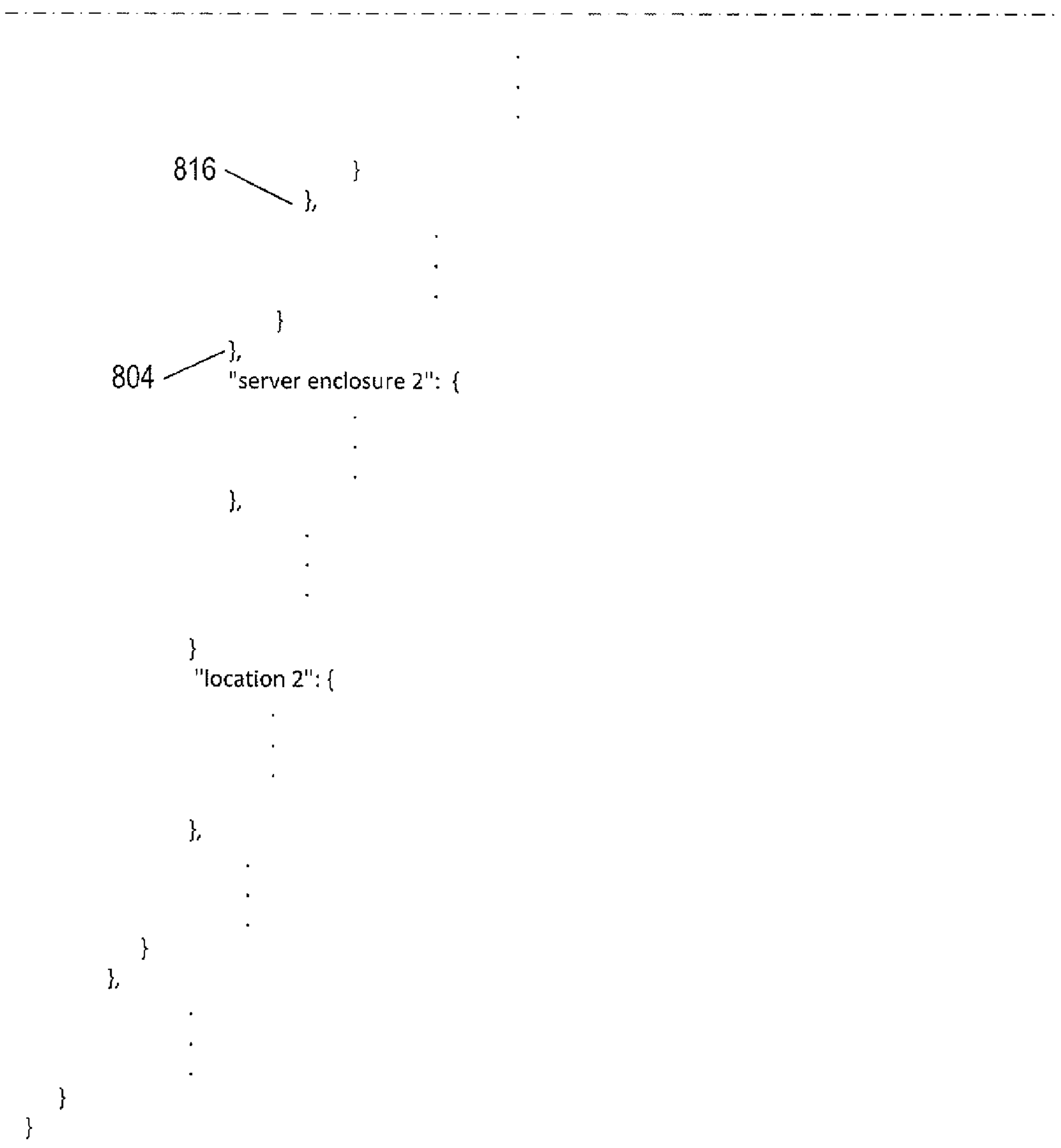

FIG. 6 is a simple component hierarchy for a simple system. Circular nodes, such as node 602, represent categories or collections not associated with version numbers and rectangular nodes, such as node 604, represent components associated with versions and other such information. FIG. 7 shows a time sequence of component hierarchies that describe the configuration of a simple data center. The root node 702 points to three different component-hierarchy subtrees with roots 704-706. Each of these subtrees represents the configuration of the data center at a different point in time. The configuration information that may be available, in a database, set of indexed files, or other such data-storage system, may be the configuration for the system at a single point in time or multiple configurations of the system at different points in time. The configuration information may be represented in a tree-like fashion, as in FIGS. 5A, 6, and 7, or may be alternative represented in other ways. One representation, equivalent to the tree-like representations shown in FIGS. 5A, 6, and 7, is a textural representation encoded in JavaScript Object Notation ("JSON") or Extended Hypertext Markup Language ("XML"). FIGS. 8A-B show a portion of a JSON encoding of the configuration of the data center illustrated in FIGS. 3-4, the configuration of which is described by the tree-like configuration hierarchy shown in FIG. 5A. In the JSON representation, each component that may be associated with a version is described by a manufacturer field, type field, a version field, and a list of components. For example, the first server enclosure in the local location is described by the text beginning on line 802 and continuing to line 804 in FIG. 8B. This server enclosure is manufactured by the Acme Company 806, as the type "EX-10" 808, has a version "1.15.02" 810, and contains the components described in the list components 812. One of these components is a blade server, the description for which starts on line 814 and extends to line 816 in FIG. 8B. For the sake of simplicity and clarity of illustration, the blade racks (406 in FIG. 4) are not listed as components in the representation shown in FIGS. 8A-B. Of course, there are a very large number of different possible ways to represent configuration information, and the approaches discussed above are provided simply to illustrate several approaches of the many different possible ways of encoding information about the configuration of a complex system.

Computer-System Configuration

In addition to configuration data, the methods and systems to which the current document is directed generate, evaluate, optimize, and use rules, or hypotheses, that describe the system configuration. In the current document, a hypothesis is a logic-based explanation of the observed configuration or configurations of a complex system. As with the above-described encoding of configuration information, there are many different possible ways for expressing configuration rules or hypotheses, including in any of various programming languages, in first-order logic expressions or Prolog programs, and in many other ways. For simplicity and clarity of description, a very simple logic-expression language is next described, with reference to FIGS. 9-11, as a very simple example of the types of encodings that can be used for generating, storing, evaluating, and optimizing hypotheses.

Figure 9:
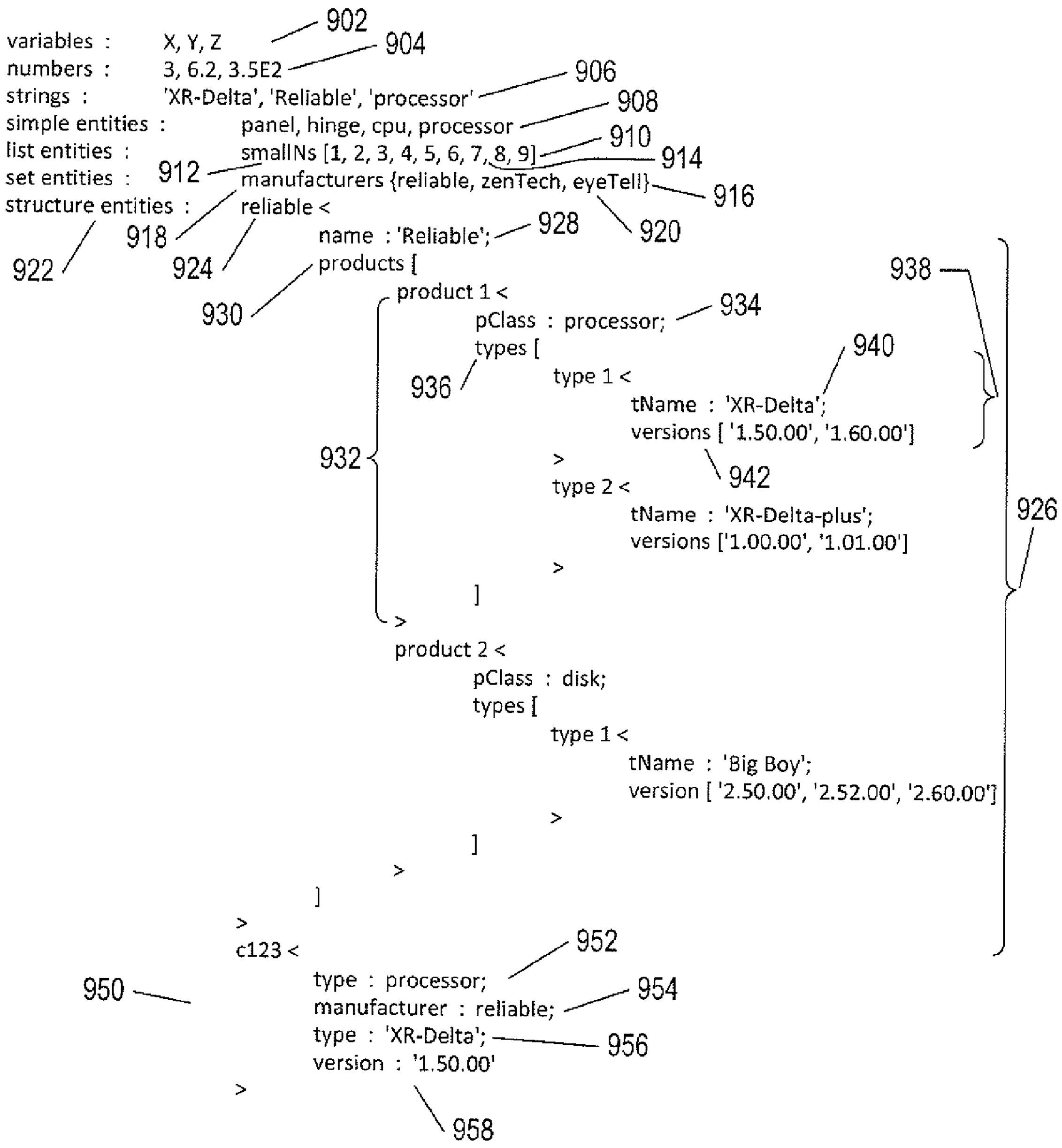
FIG. 9 shows the types of data representations used in a simple hypothesis language.

FIG. 9 shows the types of data representations used in a simple hypothesis language. In FIG. 9. the types of various data objects, including various types of entities, are shown, followed by examples. Variables are encoded as either single capital letters or character strings that begin with a capital letter, such as the example variables X, Y, and Z 902. Numbers are encoded in a fashion similar to their encoding in most computer programming languages 904. Arbitrary strings are encoded as the string bracketed by single parentheses 906. Simple entities are represented by character strings that begin with lower-case characters 908. In addition, the language provides for list entities 910 which include a list name 912 and a comma-delimited list of entities within square brackets 914. Set entities 916 include a set name 918 and a comma-delimited list of entities within the set enclosed in curly brackets 920. Structure entities 922 include a structure name 924 and a JSON-like structure definition 926 enclosed within angle brackets. The structure entity reliable represents a manufacturer and includes and name of the manufacturer 928 and a list of products 930 manufactured by the manufacturer. This list of products contains one or more product structures, such as product structure 932, each product described by a class name 934 and a list of types of products manufactured by the manufacturer of that class 936. Each type, such as type 938, includes a type name 940 and a list of the different versions that have been manufactured for that particular type 942. The structure entity "c123" 950 represents a particular processor, and includes fields that describe the type of component 952, the manufacturer 954, the type of the component 956, and the version of the component 958.

FIG. 10 illustrates the various types of operator elements of the simple hypothesis language. FIG. 10 uses illustration conventions similar to those used in FIG. 9. The operator elements include relational operators 1002, numeric operators 1004, built-in functions 1006, logical operators 1008, and built-in rules 1010. These types of operators and functions are similar to the operators and functions available in many programming languages, including the programming language Prolog. The example built-in rule, "component," 1012 states that an entity represented by the variable X is a component when the logical expression to the right of the implication symbol 1014 evaluates to the Boolean value TRUE. This expression includes a list of subexpressions joined together by AND operators. A first subexpression 1016 is a Prolog-like matching expression that is true when there exists a structure entity in the configuration database with four highest-level structure-entity components with the same name as the name represented by the variable X. The second clause 1018 evaluates to true when the name represented by variable X can be found in the set "components." This rule basically states that an entity with a name represented by the variable X is a component if X is the name of a structure entity, such as structure entity 950 in FIG. 9, the name of which can be found in the set "components," the product class value of which can be found in the set "targets," the manufacturer of which can be found in the set "manufacturers," and the version of which can be found in the version list for a product type for the product class listed within the structure entity corresponding to the manufacturer.

Hypotheses are expressed as rules in the simple hypothesis language illustrated in FIGS. 9-10. FIG. 11 shows two different possible configuration rules. The first configuration rule 1102 includes two different logic expressions 1104 and 1106. The first logic expression states that the target represented by variable X has the latest version when it has the last version in the list of versions for the type of product made by the manufacturer of the component identified by variable X. The second expression 1106 states that the system is properly configured when there does not exist a component X that does not have the latest version. In other words, the two logical expression 1104 and 1106 that together comprise configuration rule 1102 specify that all components of a system need to have the latest possible version. FIG. 11 shows a second, much different configuration rule 1108. This rule is a very long set of clauses joined together by AND operators. In essence, the rule states that the system is properly configured when each component of the system has a specific version. In the example shown in FIG. 11, the ellipses 1110 represent many additional clauses not shown for the sake of simplicity of illustration. In the case that the system includes 20,006 components, this expression would have 20,006 clauses that specify the exact version of each component.

Configuration rules, or logical expressions represented in hypothesis language, are evaluated with respect to configuration data for one or more components automatically, using theorem provers or resolvers, such as those developed for evaluating Prolog expressions. The particular types of theorem prover or resolver depends on the hypothesis language and on the class of logical expressions that can be expressed using the hypothesis language. Theorem provers for first-order logical expressions are well know, for example, although it should be noted that first-order logic can be used to express only a subset of all possible configuration rules. Nonetheless, even first-order expressions are generally sufficient for developing rules that capture configuration logic. Higher-order logical expressions can alternatively be used, as can any of many different programming languages for which compilers have been constructed.

Figure 12:
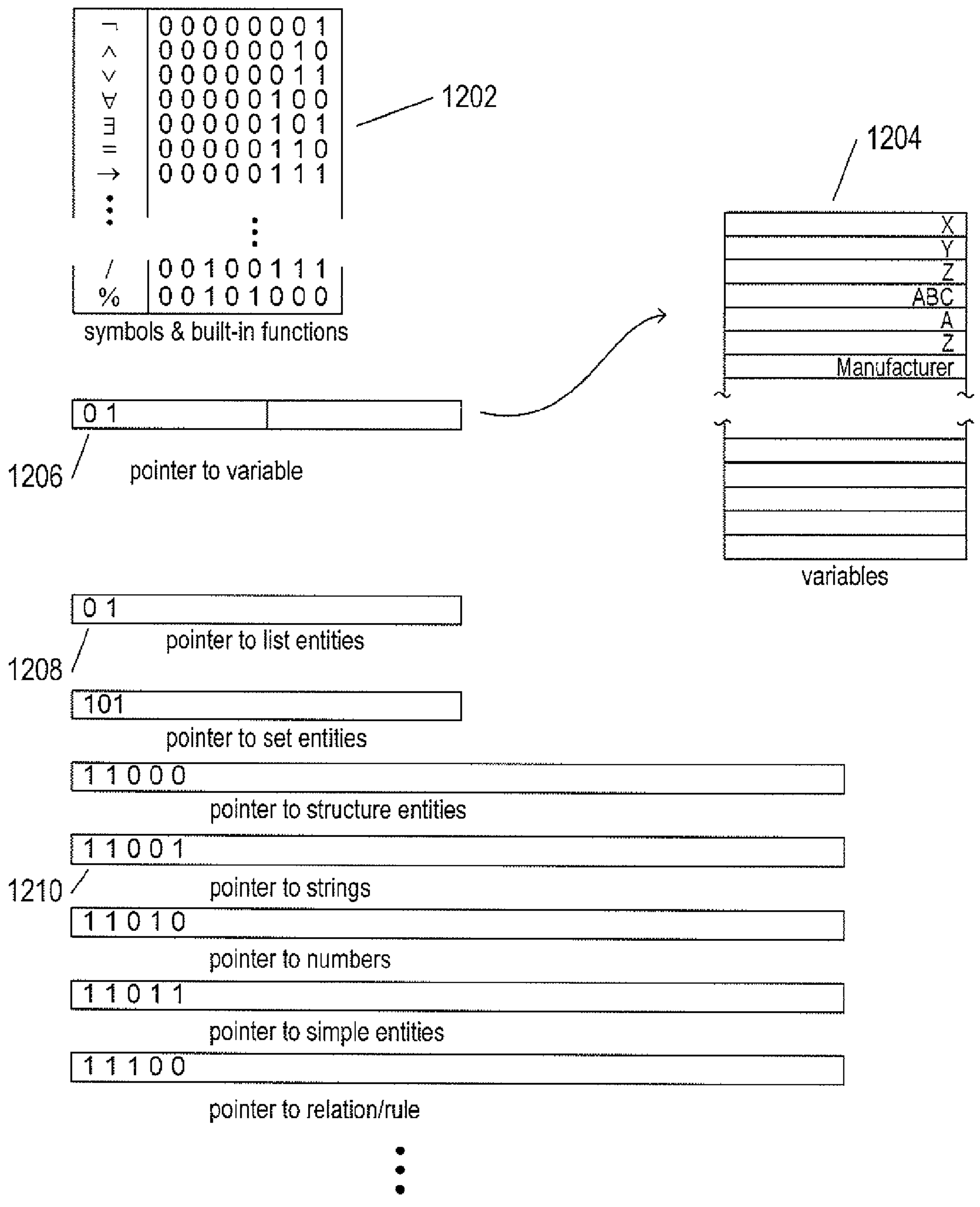
FIG. 12 illustrates one approach for encoding the symbols, constant numerical and string values, and the names of functions and entities in hypothesis-language expressions.
Figure 13:
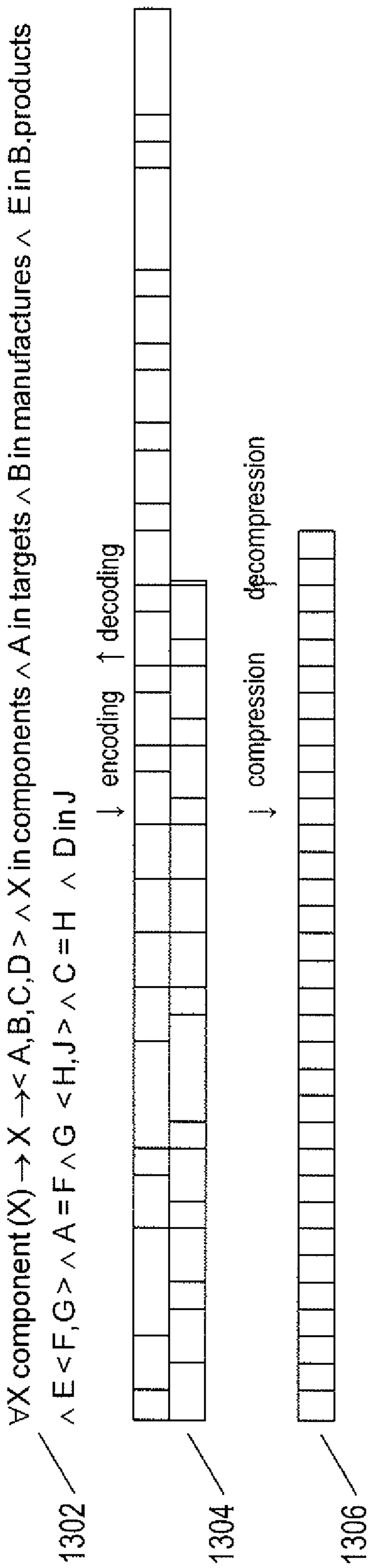
FIG. 13 illustrates encoding and compressing a hypothesis-language expression to produce a minimum-length or near-minimum-length representation of the hypothesis-language expression.

However rules are expressed, their form of expression can generally be compressed from an original number of bytes or words to a smaller number of bytes or words. For example, when rules are expressed in the above-described hypothesis language, normal Unicode text encoding may be used to encode the strings of symbols representing rules. One method for compressing the representation of rules is to encode the symbols, constant numerical and string values, and the names of functions and entities in some systematic manner. FIG. 12 illustrates one approach for encoding the symbols, constant numerical and string values, and the names of functions and entities in hypothesis-language expressions. All of the symbols in the hypothesis language may be encoded within bytes, with a table of byte encodings 1202 of symbols shown in FIG. 12. In the current example, only six bits within eight-bit bytes are needed to specify all of the symbols. Therefore, the leading two bits are always "0." Therefore, an encoded entity starting with two leading "0" bits is a byte representation of a symbol, with the remaining six bits indicating which symbol is encoded in the byte. Assuming that there are less than 16,384 variable names, all the variable names can be entered into a table 1204 and a two-byte pointer 1206 with leading bits "01" can be used as both a reference to the particular variable name within the table as well as the encoding of the variable name. Similarly, various additional types of pointers beginning with a sequence of bit values that specify the type of pointer can be used to encode the names of list entities 1208, string constants 1210, and other elements of the hypothesis language. The encoding illustrated in FIG. 12 is but one example of many different possible encodings that can be used to encode each element of hypothesis language into portions of bytes, bytes, and a small sequence of bytes used as a reference to an entry in a table storing entity representations. Additionally, once an expression is encoded, the expression may be compressed using any of various different types of compression methods. Examples include run-length encoding and other methods that compress the encoding by recognizing and removing redundant bits within a sequence of bits. FIG. 13 illustrates encoding and compressing a hypothesis-language expression to produce a minimum-length or near-minimum-length representation of the hypothesis-language expression. Thus, as shown in FIG. 13, a hypothesis-language expression 1302 can be first encoded 1304 and then compressed 1306 to produce a minimum-length or near-minimum-length representation of the original expression. Only non-lossy compression methods are used so that the compressed version of the expression can be faithfully decompressed and decoded to reveal an exact reproduction of the original expression. The reason for the encoding and compression is to reduce an expression to a minimal or near-minimal length, so that the length of the encoded and compressed expression can be used as an estimate of the complexity of the expression. To this end, a highly compressive encoding or compression method can be used, rather than both an encoding and compression method together, in alternative embodiments.

Figure 14A:
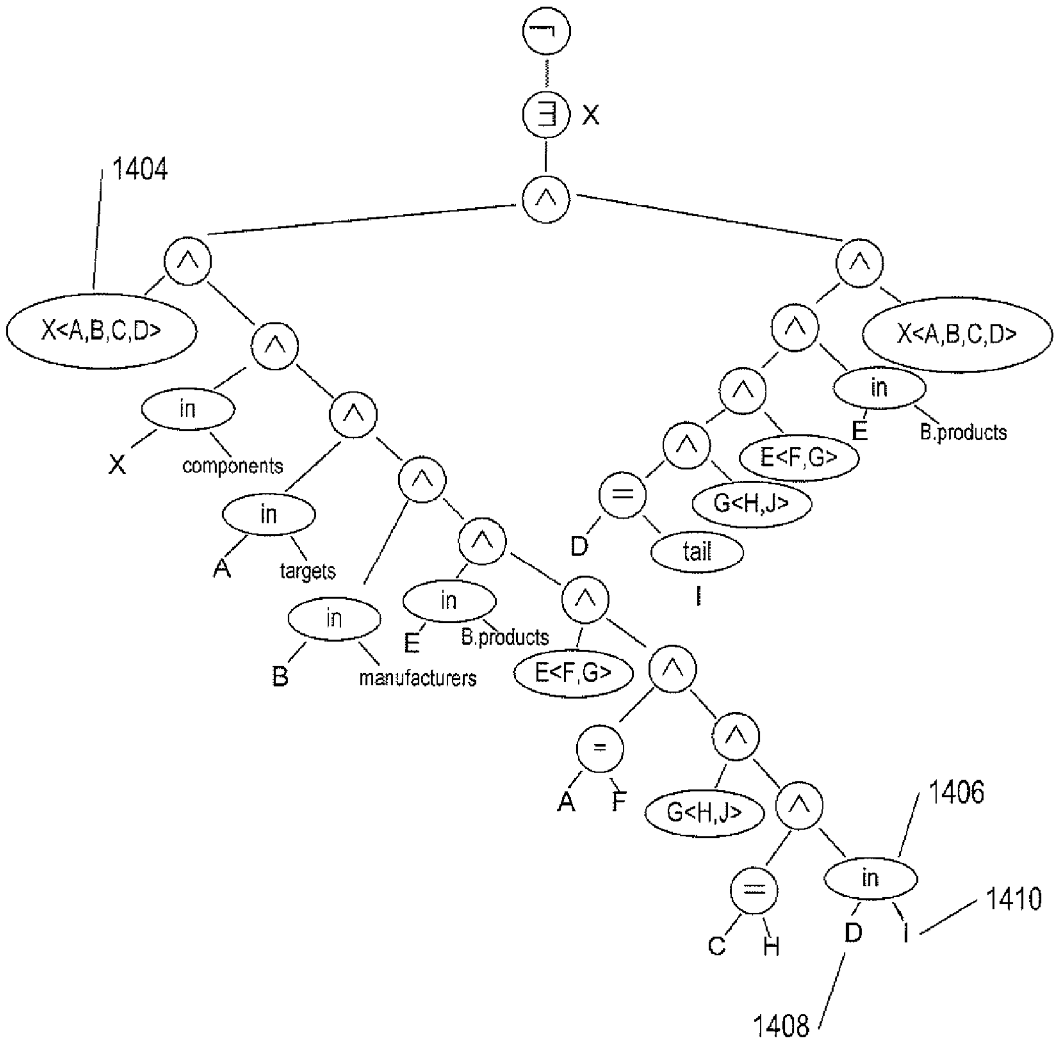
FIGS. 14A-B illustrate abstract syntax trees corresponding to configuration rule 1102 shown in FIG. 11.
Figure 14B:
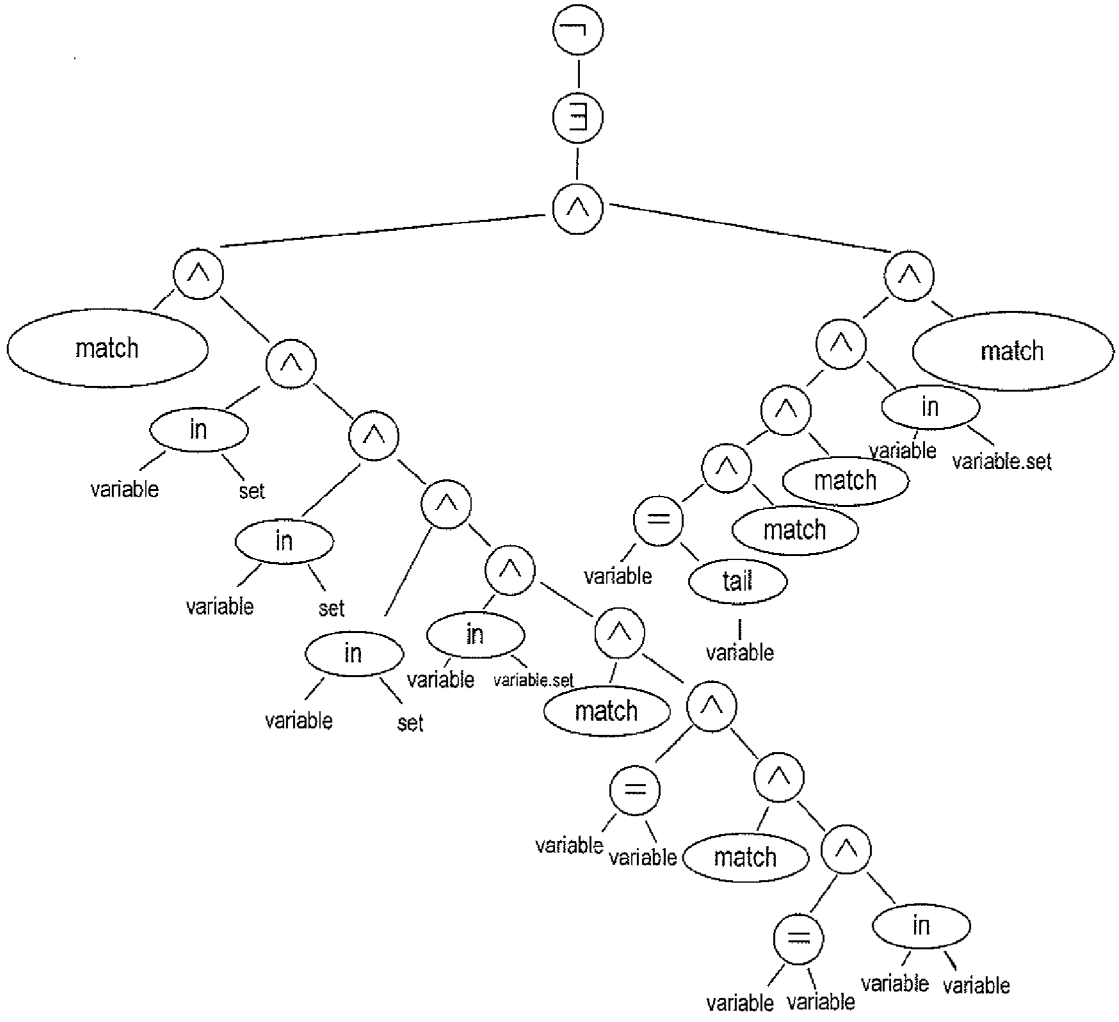
Figure 15A:
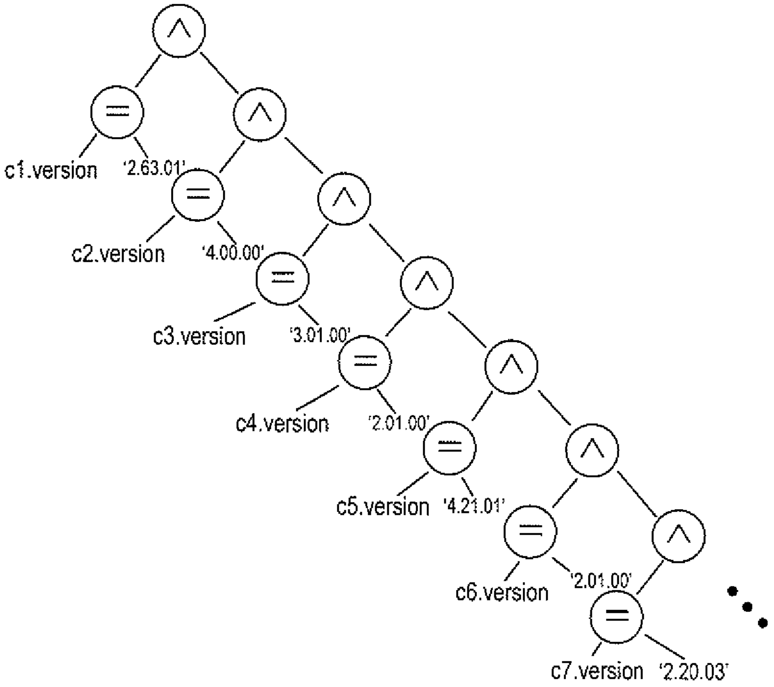
FIGS. 15A-B show an abstract syntax tree and skeletal abstract syntax tree for the configuration rule 1108 shown in FIG. 11.
Figure 15B:
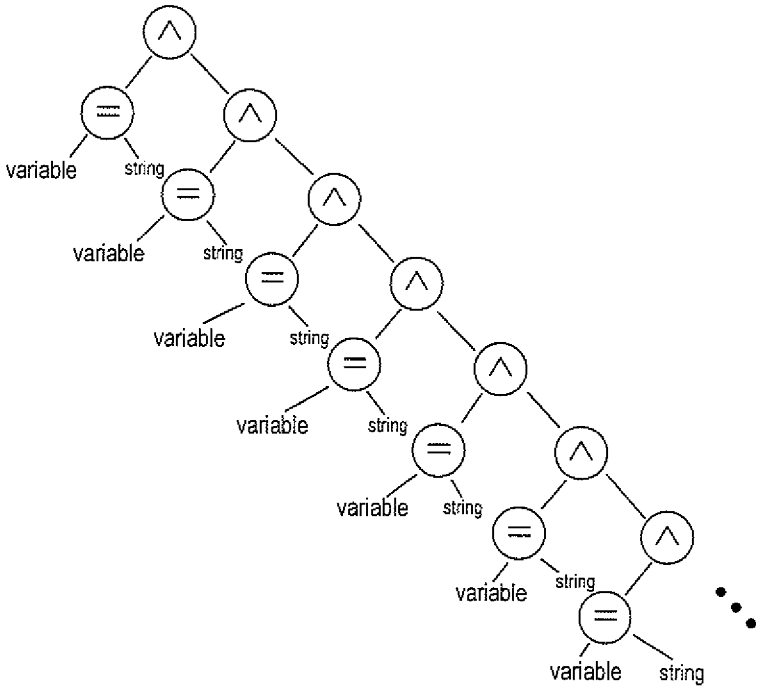

Generally, expressions in first-order logic, hypothesis languages, and computer-programming languages are parsed into parse trees or abstract syntax trees as one step in evaluation of the expressions. FIGS. 14A-B illustrate abstract syntax trees corresponding to configuration rule 1102 shown in FIG. 11. There are many different types of abstract syntax trees with associated procedures for evaluation. In the abstract syntax tree shown in FIG. 14A, for example, matching operations, such as matching operation represented by node 1404, need to be resolved or evaluated prior to resolution of lower-level nodes. The leaf nodes of the abstract syntax tree correspond to instantiation of variables, entities, and constants. For example, the subtree rooted by node 1406 represents the built-in function "in" called to determine whether the instantiation of variable D 1408 can be found in the instantiation of the set variable I 1410. The abstract syntax tree shown in FIG. 14A can be generalized to a skeletal abstract syntax tree shown in FIG. 14B. The skeletal abstract syntax tree has the same form and structure, but the leaf nodes and expressions in match operators are not uniquely specified. FIGS. 15A-B similarly shown an abstract syntax tree and skeletal abstract syntax tree for the configuration rule 1108 shown in FIG. 11.

Hypothesis Generation and Selection

The methods and systems to which the current document is directed employ configuration data and an initial set of hypotheses to search the space of all possible hypotheses in order to find candidate hypotheses that explain the observed configuration data. The initial hypotheses may range from relatively simple hypotheses, such as hypothesis 1102 in FIG. 11, to the complex, but trivial hypothesis 1108 in FIG. 11. Hypothesis 1108 in FIG. 11 is trivially true for a single set of configuration data collected at a particular point in time for a complex system, since the exact version and exact values for any additional parameters associated with each component in the complex system is exactly specified. By contrast, in the case of the complex system in which the version of each component is the latest available version for that component, both hypotheses 1102 and 1108 would be true. However, in this latter case, hypothesis 1102 would be preferred, since it concisely specifies the version characteristics of the components of the system and, moreover, characterizes the version characteristics of the components to a complex system in a way that is accessible to, and consistent with, the ways in which human system administrators specify system configurations. Thus, conciseness or simplicity of a hypothesis is one test for the desirability or acceptability of the hypothesis.

However, conciseness does not, alone, provide a complete basis for selecting hypotheses and for steering the search of the hypothesis space. As one example, the following rule always evaluates to true: X=X. However, this very concise rule, which is always true, provides no insight with respect to whether or not the rule explains the configuration data. Thus, another aspect of hypothesis selection is the restrictiveness of a hypothesis. When, for example, a hypothesis evaluates to true for any possible complex-system configuration, then the hypothesis has no value, because the hypothesis equally well explains all possible configurations rather than the actually observed configurations. In the case where the configuration of a system consists of the versions of all of its components, one way to characterize the restrictiveness of a hypothesis is to determine how many versions would evaluate to true for each target component within the complex system and then multiply together these values to generate the number of different configurations for the complex system that would evaluate to true under the hypothesis. The fewer the number of configurations that would evaluate to true, the more restrictive the hypothesis.

However, conciseness, or simplicity of a hypothesis and restrictiveness of a hypothesis do not together provide a sufficient basis for selecting one hypothesis over another. As one example, consider hypothesis 1102 in FIG. 11 applied to a complex system in which each target has a version less than the latest version available for that target. Hypothesis 1102 would score well with respect to simplicity and restrictiveness, but would be completely inaccurate with regard to explaining the versions observed for components within the complex system. A third criteria for determining the desirability of a hypothesis is whether or not the hypothesis accurately predicts observed configurations. One measure for accuracy is to apply the hypothesis to each target component to determine whether the hypothesis would evaluate to true given the observed version of the target component. Then, the ratio of the number of target-component versions accurately predicted by the hypothesis with respect to the total number of target components can be determined. The greater the accuracy of the hypothesis, the closer this ratio approaches to 1.0.

Therefore, the method and systems to which the current document is directed search the space of possible hypotheses for hypotheses with the best combination of simplicity, restrictiveness, and accuracy. In one approach, a score can be computed based on computed simplicity, restrictiveness, and accuracy for each hypothesis, with those hypotheses associated with scores of highest magnitude deemed most desirable. The problem thus becomes a classical optimization problem in which a set of candidate hypotheses are optimized with respect to the computed score for the hypothesis.

In order to search the space of possible hypotheses, new candidate hypotheses need to be generated from an initial set of hypotheses. One approach to generation of new candidate hypotheses is the genetic-programming approach, in which new candidate hypothesis can be generated from a set of current hypotheses.

Figure 16:
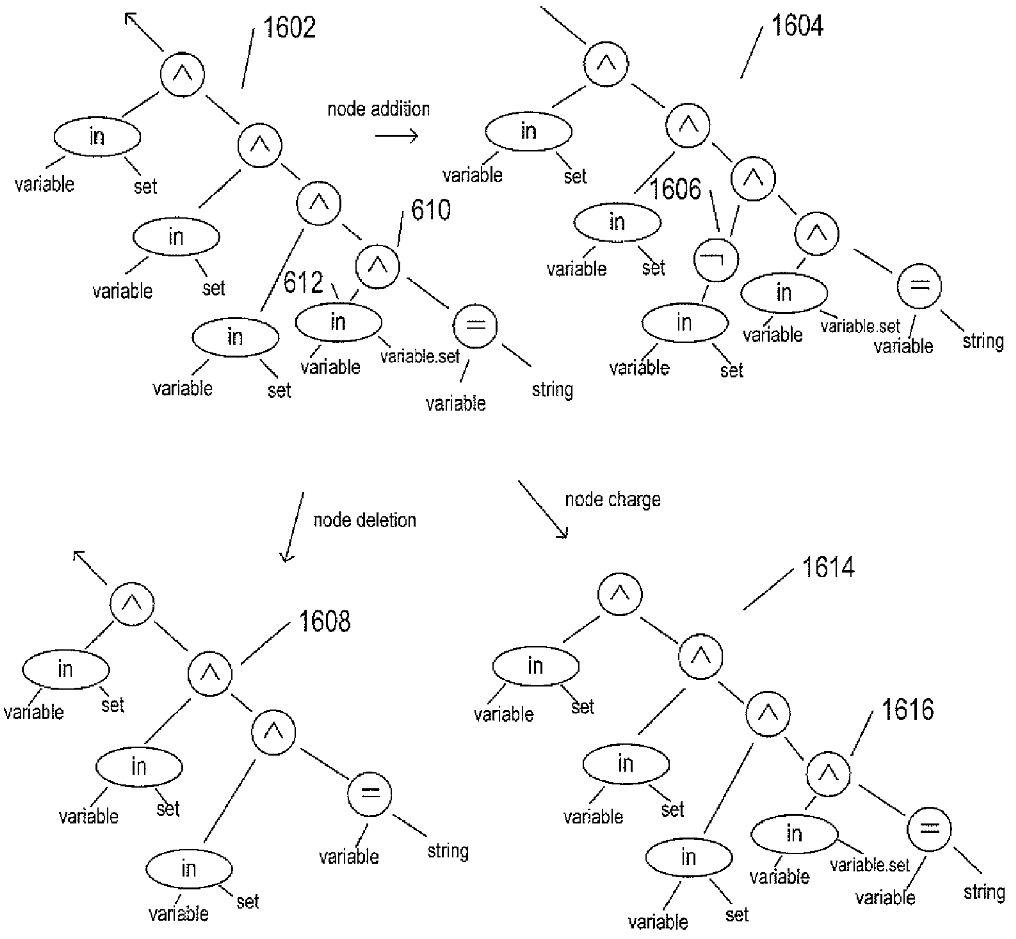
FIG. 16 illustrates one type of alteration to current hypotheses that can be used to generate new candidate hypotheses, referred to as "mutations."

FIG. 16 illustrates one type of alteration to current hypotheses that can be used to generate new candidate hypotheses, referred to as "mutations." In general, operations for producing new candidate hypotheses are carried out on skeletal syntax trees, such as those discussed above with reference to FIGS. 14B and 15B. In FIG. 16, a portion 1602 of a current hypothesis is shown. One type of mutation is to add a node to the current hypothesis, referred to as "node addition." In FIG. 16, the results of node addition 1604 is a subtree of a hypothesis nearly equivalent to subtree 1602, with the exception that a new node 1606 has been added. This new node changes the meaning of the logical expression. For genetic-programming purposes, only those mutations that produce syntactically correct new candidate hypotheses are allowed. The newly introduced node 1606 corresponding to the logical not operation is allowable because, although it changes the sense of the subtree roots by this new node, the new candidate hypothesis subtree 1604 remains syntactically correct. Another type of mutation is referred to as "node deletion." In FIG. 16, the subtree 1608 is produced from subtree 1602 by deletion of node 1610 and the left-hand subtree rooted at this deleted node that includes the built-in-function node 1612. Yet another type of mutation, referred to as a "node change mutation," involves changing a node. For example, in FIG. 16, the new candidate hypothesis subtree 1614 is generated from subtree 1602 by changing the logical-AND node 1610 to a logical-OR node 1616.

Figure 17:
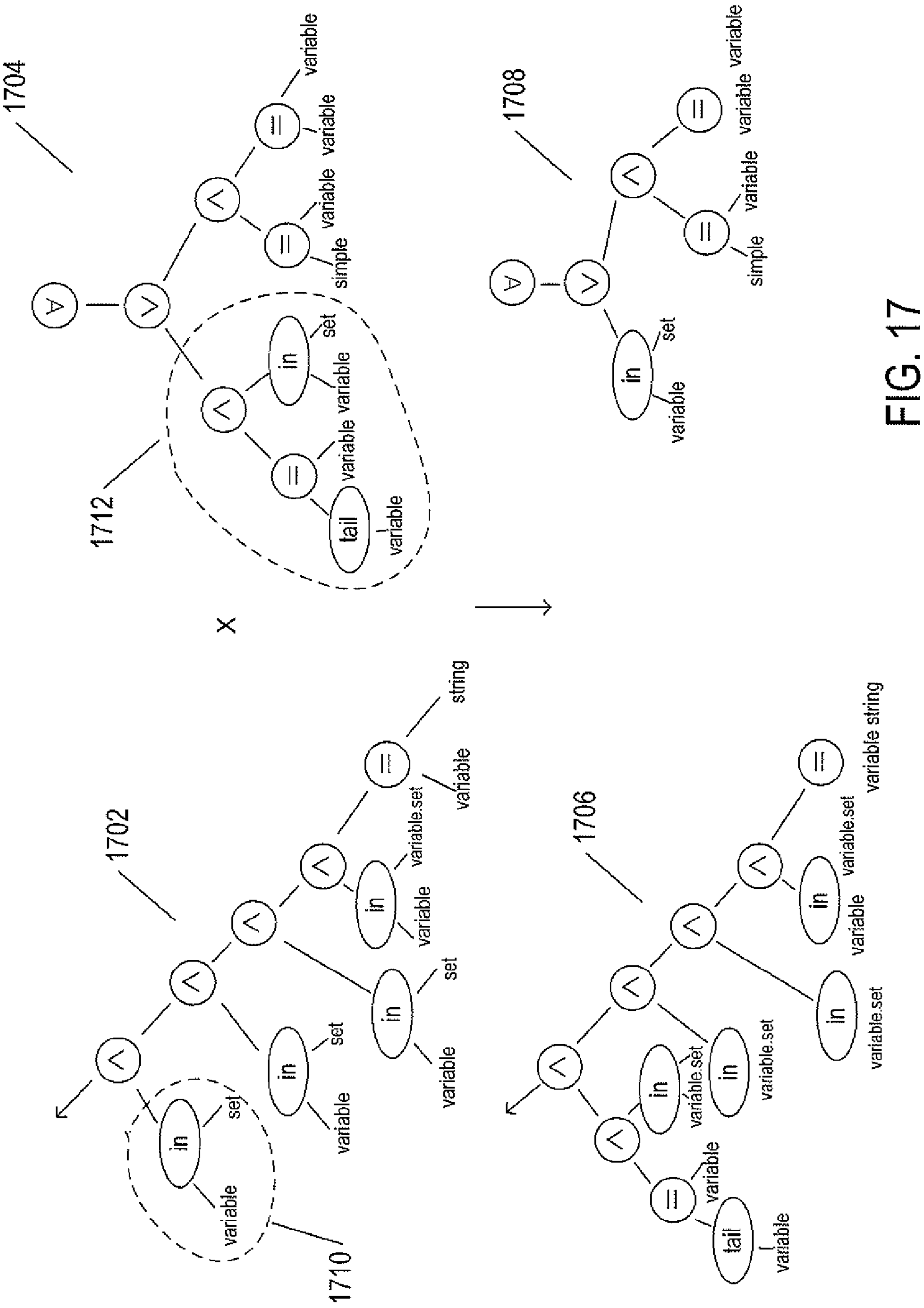
FIG. 17 illustrates a crossover operation.

Another way to produce new candidate hypotheses is by a crossover. FIG. 17 illustrates a crossover operation. In FIG. 17, a portion of a first current hypothesis 1702 and a second current hypothesis 1704 are shown at the top of the figure. A crossover alters both the portion of the first hypothesis 1702 and the second hypothesis 1704 to produce two new candidate hypotheses 1706 and 1708. In the crossover illustrated in FIG. 17, the subtree 1710 of the first current hypothesis and the subtree 1712 of the second current hypothesis are interchanged. As with mutations, only those crossovers that produce syntactically correct new hypotheses are allowed.

Figure 18A:
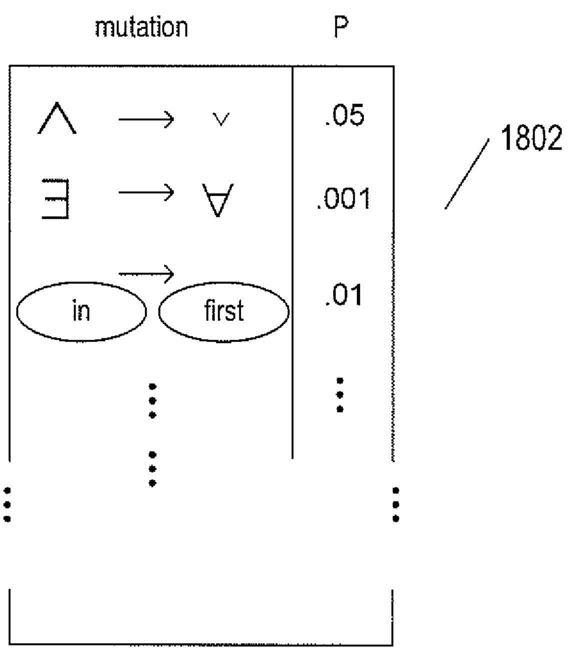
FIGS. 18A-B show a portion of a mutation table and a portion of a crossover table.
Figure 18B:
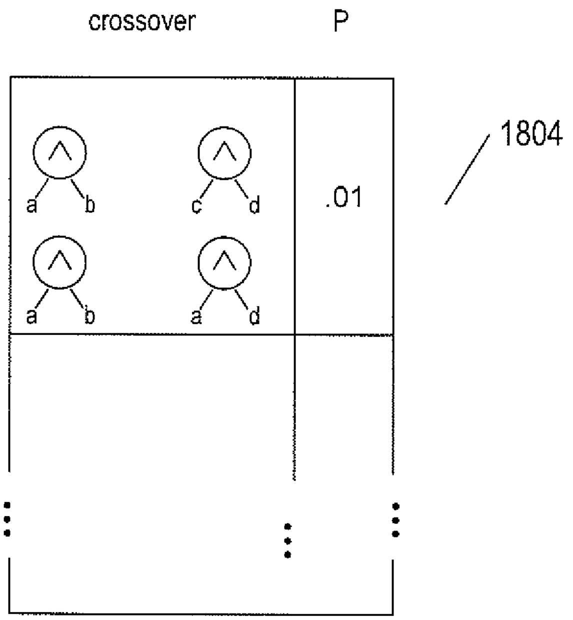

In general, the types of mutations and crossovers may be encoded into tables, with each type of mutation and crossover associated with a probability. FIG. 18A shows a portion of a mutation table 1802 and FIG. 1 SB shows a portion of a crossover table 1804. In certain genetic-programming methods, genetic operations, including mutations and crossovers, are applied to randomly selected portions of syntax trees at frequencies proportional to the probabilities associated with the mutations and crossovers to produce new candidate hypotheses.

In the methods and systems to which the current document is directed, the genetic-programming approach is used to generate new candidate skeletal syntax trees from the syntax-tree representations of a set of current hypotheses. This approach is carried out iteratively over multiple generations, with mutations and crossovers applied to a subset of the current set of hypotheses that are deemed to be most fit, with fitness related to the above-discussed score that takes into consideration the simplicity, restrictiveness, and accuracy of the hypothesis. While the mutations and crossovers affect only the skeletal syntax tree, the values of the leaf nodes representing match expressions, entities, and constants are also varied, from generation to generation, but by a different technique referred to as "simulated annealing." In simulated annealing, the values of the match expressions, entity identifiers, and constants are iteratively altered in order to find a set of match expressions, entity identifiers, and constants that produce the most fit candidate hypothesis, or a candidate hypothesis with the best score corresponding to a particular candidate skeletal syntax tree. In certain implementations, the current values for the leaf nodes are used as a starting point, and simulated annealing is used to optimize the values of the leaf nodes.

Figure 19:
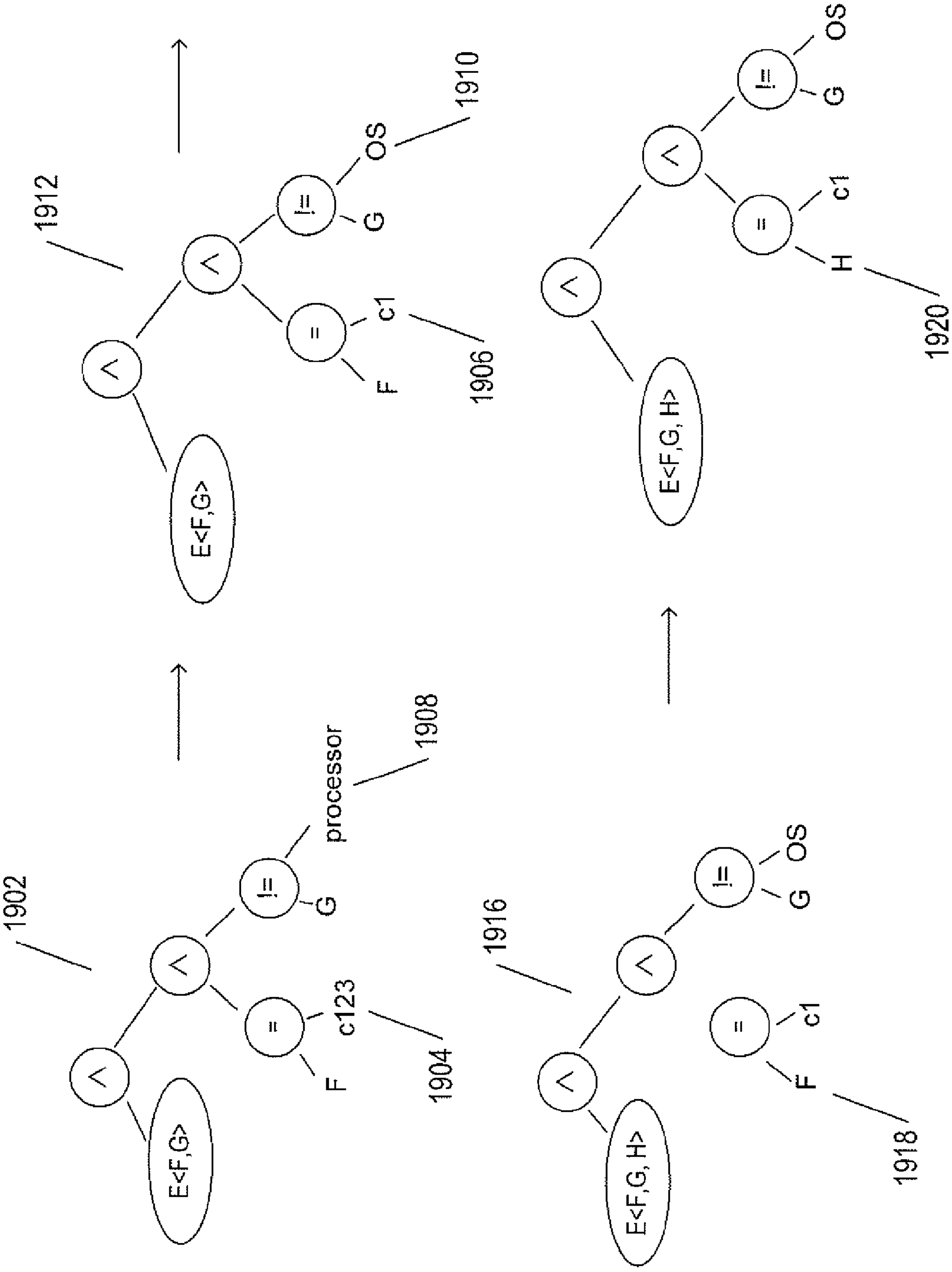
FIG. 19 illustrates a sequence of operations that occur during a hypothetical simulated annealing with respect to a small syntax tree corresponding to a candidate hypothesis.

FIG. 19 illustrates a sequence of operations that occur during a hypothetical simulated annealing with respect to a small syntax tree corresponding to a candidate hypothesis. Initially, the candidate hypothesis is represented as syntax tree 1902. Then, a series of changes are made to the values of the leaf nodes. In a first change, the value of leaf node 1904 "c 123," is changed to "c1" 1906 and the value of the leaf node 1908, "processor," is changed to "OS" 1910. Thus, a next candidate syntax tree 1912 is produced by altering the two leaf-node values 1904 and 1908. In a next step, the expression in the match node 1914 is altered to produce a subsequent candidate syntax tree 1916. This enables yet another change in the leaf node values, namely a change in the value of leaf node 1918, "F," to "H" 1920. As with generic operations, only leaf-node-value changes that produce reasonable syntax trees that can be evaluated to TRUE or FALSE are allowed.

Figure 20A:
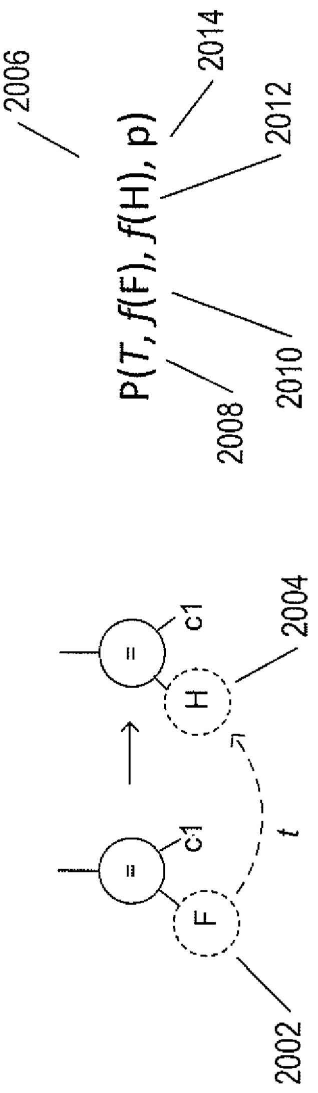
FIGS. 20A-C illustrate criteria for leaf-node-value changes during simulated annealing.
Figure 20B:
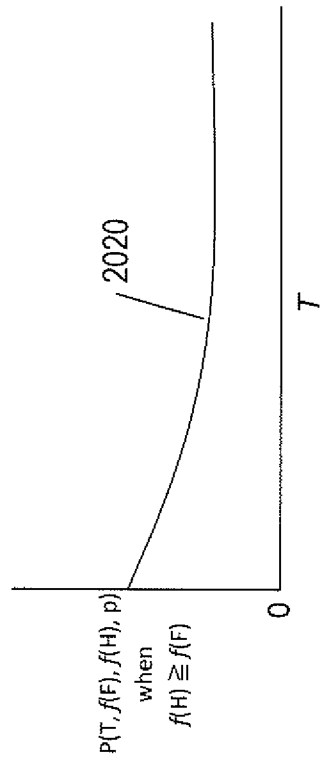
Figure 20C:
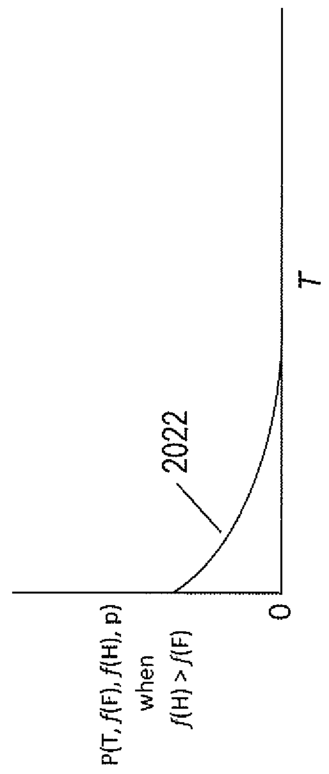

The phrase "simulated annealing" comes from physical systems, such as crystallization and hardening of materials as temperature is decreased. The idea is to initially allow relatively radical changes to occur, in order to broadly explore the space of parameter values, and then to decrease the magnitude of the changes, over time, to allow the parameters to settle into a minimal-energy configuration. Simulated annealing therefore generally occurs over a fixed number of iterations, during each of which leaf-node values are changed according to a computed probability. FIGS. 20A-C illustrate criteria for leaf-node-value changes during simulated annealing. As shown in FIG. 20A, each leaf-node value is considered, at each step in the simulated annealing process, for a change. For example, leaf node 2002 is considered for a change to leaf node 2004. Whether or not this change occurs depends on a computed probability for the change 2006. This probability, in certain implementations, falls to 0.0 when the resulting hypothesis following the change would not be able to be evaluated against the configuration data. The probability for the change depends on the current value of a simulated temperature, T 2008, and the computed scores or fitnesses for the current hypothesis 2010 and for the hypothesis that would be obtained by carrying out the proposed leaf-node-value change 2012. The probability calculation also depends on additional parameters 2014, including the local environment of the leaf node being changed and the configuration data. The simulated temperature value T monotonically increases with each iteration. As shown in FIG. 20B, when the fitness of a hypothesis generated by the proposed change is greater than the fitness of the initial hypothesis, the computed probability for the change decreases with increasing simulated temperature to some constant value, as shown by curve 2020 in FIG. 20B. However, when the fitness of the hypothesis obtained by the change is lower than the fitness of the initial hypothesis, the computed probability for the change decreases to 0 with increasing simulated temperature, as shown by curve 2022 in FIG. 20C. The simulated annealing process therefore continues to adjust the values of leaf nodes, over time, in order to attempt to find an optimal set of values that produces a hypothesis with greatest score or greatest fitness.

Figure 21:
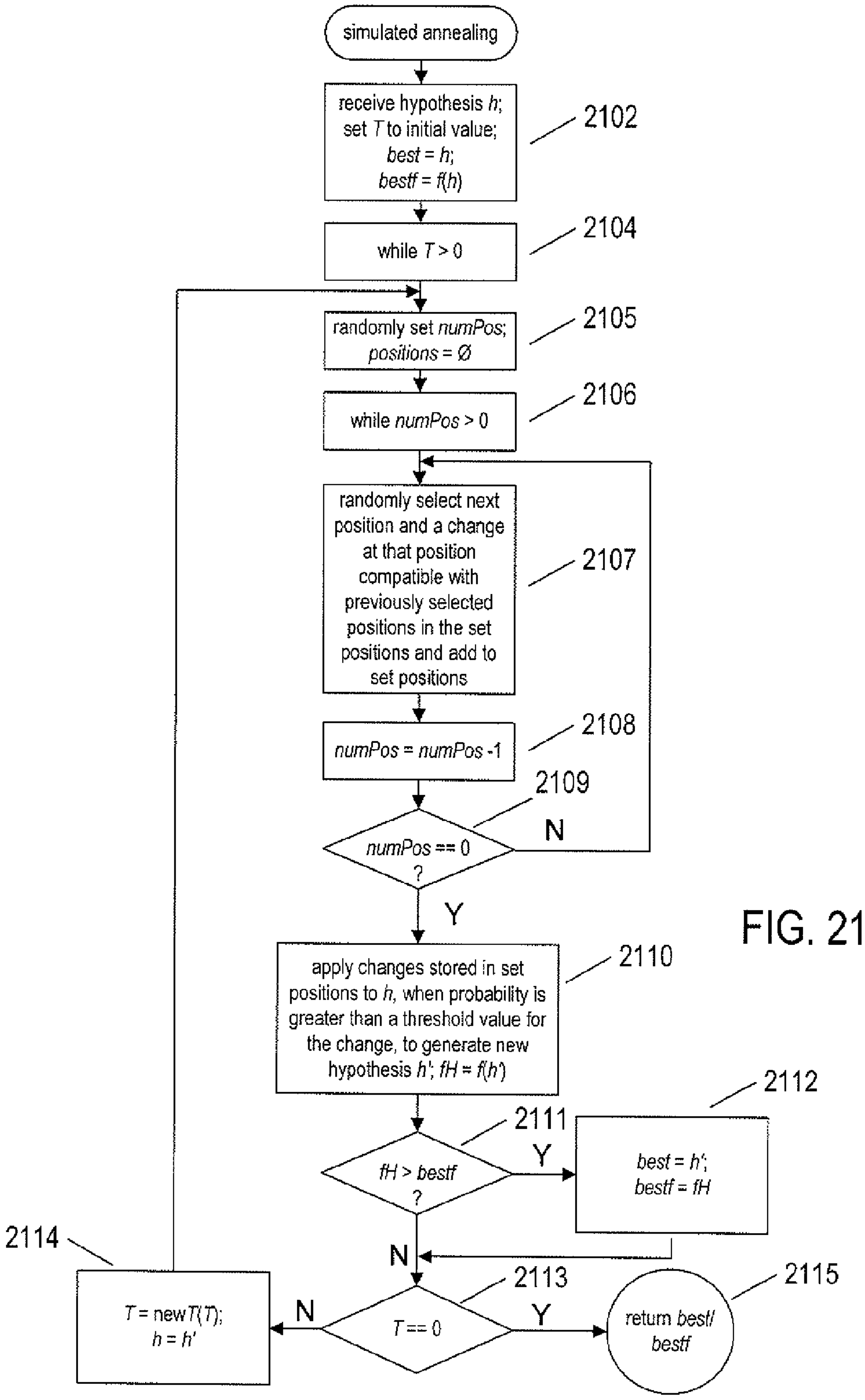
FIG. 21 illustrates the simulated-annealing method discussed above with reference to FIGS. 19 and 20A-C.

FIG. 21 illustrates the simulated-annealing method discussed above with reference to FIGS. 19 and 20A-C. In step 2102, the routine "simulated annealing" receives a hypothesis h, sets a simulated-annealing temperature parameter T to an initial value, sets a local variable best to the received hypothesis h, and sets a local variable best$f$ to the score or fitness computed for the hypothesis, $f$(h). Then, in the while-loop of steps 2104-2114, the routine "simulated annealing" carries out a sequence of iterations, in each of which the simulated-annealing temperature T is a next, lower value. In step 2105, the routine "simulated annealing" sets a local variable numPos to a random number within a specified range and sets the set variable positions to null. In the while-loop of steps 2106-2109, the routine "simulated annealing" determines a set of changes to a hypothesis at the number of positions numPos and stores these changes/positions in the set positions. Then, in step 2110, the routine "simulated annealing" considers each change/position in the set positions and applies the change to the position of the hypothesis when the probability computed for the change/position is greater than a threshold value. This application of changes generates a new hypothesis h'. The local variable ƒH is set to the score or fitness value for the new hypothesis h'. When, as determined in step 2111, ƒH is greater than bestƒ, then best is set to h' and bestƒ is set to ƒH in step 2112. The outer while-loop of steps 2104-2114 continues until the simulated-annealing temperature T decreases to 0, as determined in step 2113. When the simulated-annealing temperature T has decreased to 0, then the hypothesis referenced by local variable best and the computed fitness score for that hypothesis bestƒ are returned in step 2115. Otherwise, in step 2114, a new temperature is computed and h is set to h' in preparation for another iteration of the outer while-loop.

There are many different approaches to implementing simulated annealing. The approach illustrated in FIG. 21 is provided as an illustration of one possible approach. As one example, in certain approaches, the best observed hypothesis is not stored in local variables, and the hypothesis obtained at the completion of the outer while-loop is returned, rather than returning the best observed hypothesis. As another example, in certain implementations, only a single change at a single position is carried out in each iteration. Many different probability estimates can be made by various different methods for changes, and different probability thresholds can be used for determining whether or not to apply changes. As noted above, those changes carried out during simulated annealing to leaf-node values preserve the correctness of the hypothesis. For example, a change of a variable name to a name that has not been introduced at a higher level of the tree may not be allowed, since the change would produce an expression that could not be evaluated by an automated theorem prover or resolver.

Figure 22:
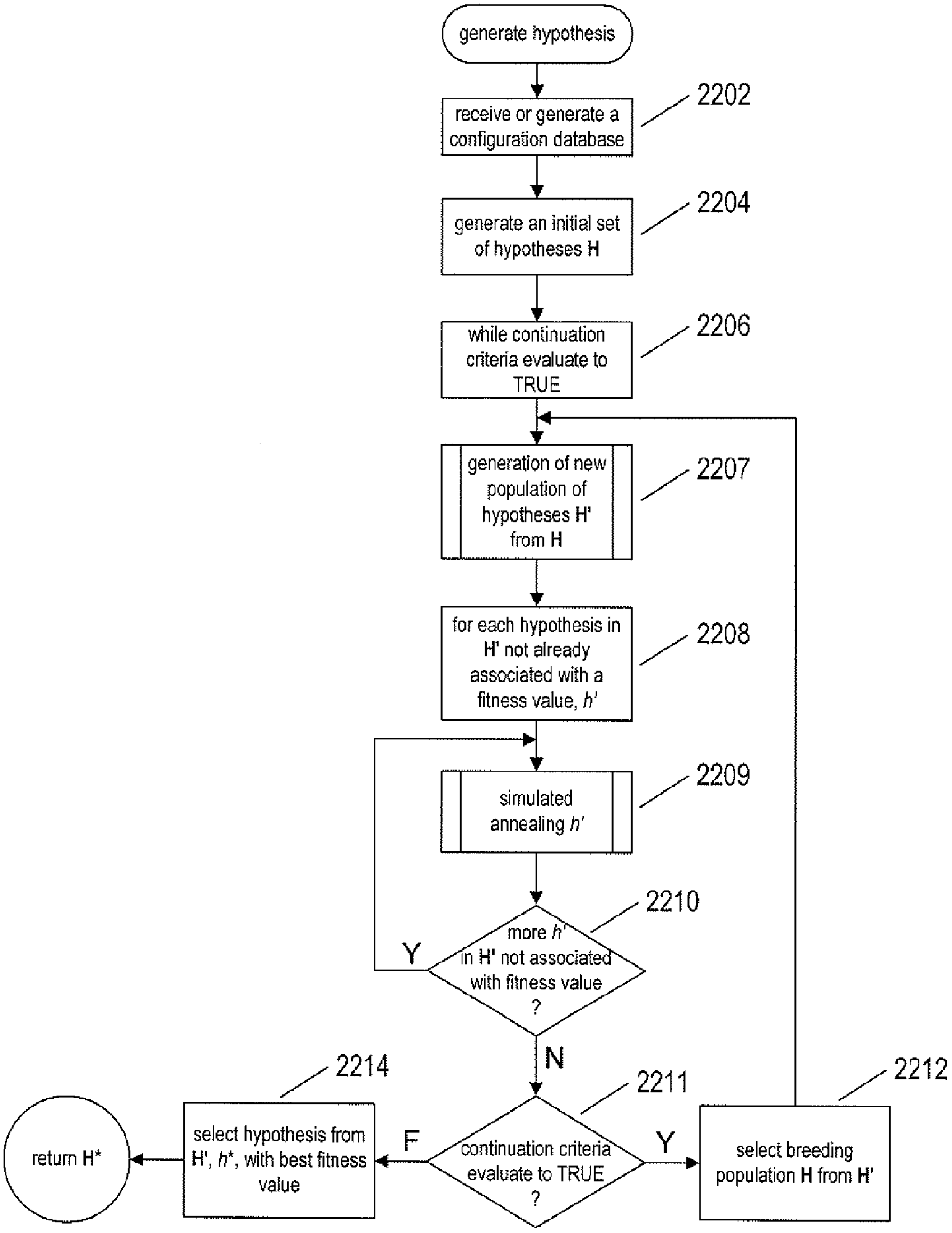
FIG. 22 provides a control-flow diagram for a routine "generate hypothesis" that produces a hypothesis to explain a set of configuration data.

FIG. 22 provides a control-flow diagram for a routine "generate hypothesis" that produces a hypothesis to explain a set of configuration data. In step 2202, the configuration database is received or generated. For example, the routine may be passed a reference to a configuration database that stores data representing the configuration of a complex system at one or more points in time. Alternatively, the routine "generate hypothesis" may undertake various steps, including interactive steps, to collect configuration data and store the configuration data in a configuration database. Next, in step 2204, the routine "generate hypothesis" generates an initial set of hypotheses H. The initial set of hypotheses may be various types of simple hypothesis, such as hypothesis 1102 in FIG. 11 as well as hypotheses that exactly explain the observed configuration data, such as hypothesis 1108 in FIG. 11. In addition, hypotheses may be randomly generated. Next, in the while-loop of steps 2206-2212, the routine "generate hypothesis" continues to generate new candidate hypotheses, generation by generation, until a set of continuation criteria evaluates to FALSE. These continuation criteria may be the completion of a fixed number of generations, generation of at least one candidate hypothesis with a fitness value greater than some threshold fitness value, or other similar criteria. In certain implementations, the set of one or more termination conditions evaluates to FALSE when at least one of the termination conditions evaluates to FALSE. In other implementations, the set of one or more termination conditions evaluates to FALSE when at least a threshold number or percentage of the termination conditions evaluate to FALSE. The sense of the termination conditions may, in alternative implementations, specify termination when one or more termination conditions evaluate to TRUE. In step 2207, the routine "generate hypothesis" generates a new set of candidate hypotheses H' from the current set of hypotheses H. In the for-loop of steps 2208-2210, the routine "generate hypothesis" generates a fitness value, or score, for each hypothesis in the new population of hypotheses H' that is not already associated with a fitness value by carrying out simulated annealing from the hypothesis, in step 2209. When the continuation criteria evaluate to TRUE, as determined in step 2211, then the routine "generate hypothesis" selects a new breeding population H from H' in step 2212. When the continuation criteria fail to evaluate to TRUE, then the hypothesis with greatest fitness value is selected from the current set of hypothesis H', in step 2214, and returned.

Figure 23:
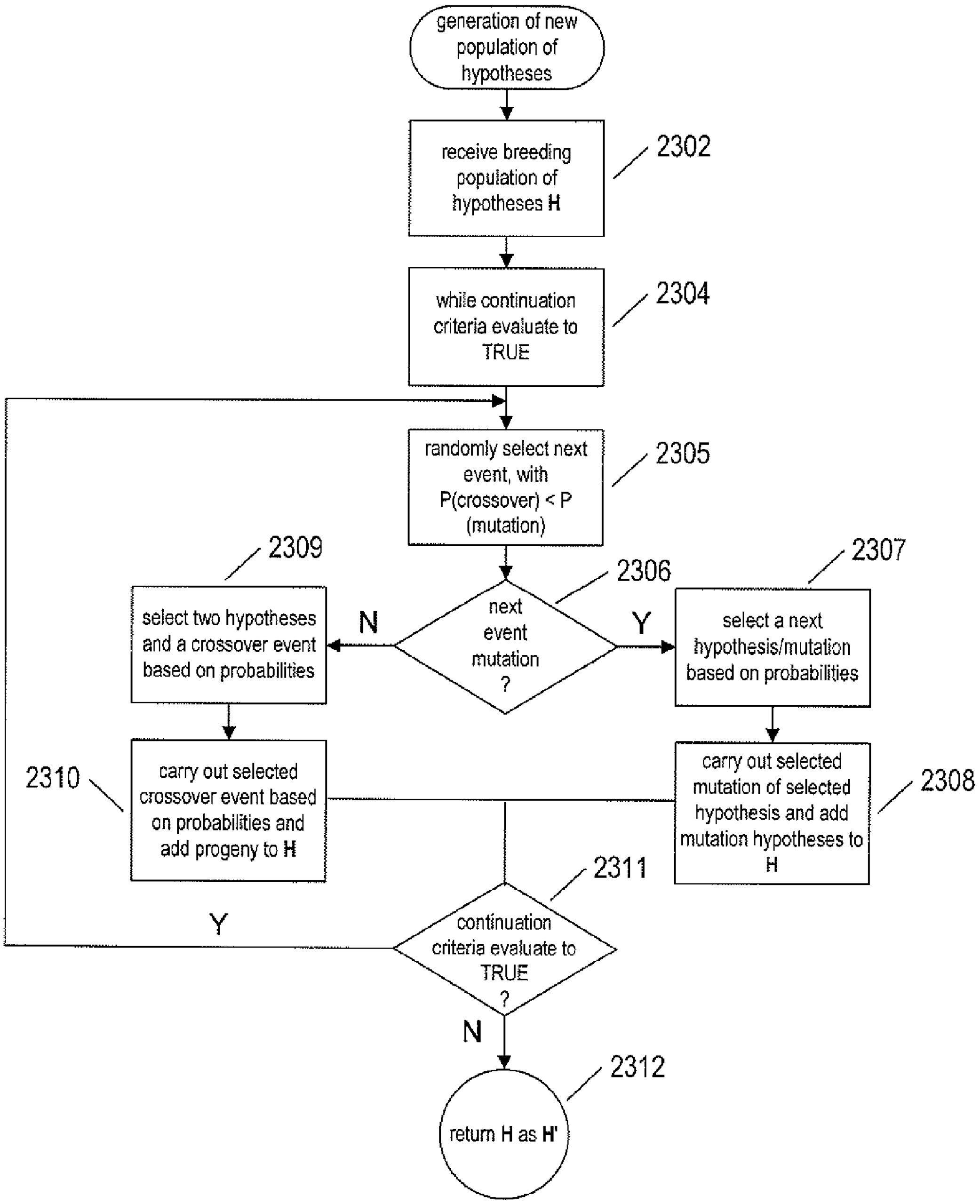
FIG. 23 provides a control-flow diagram for the routine "generation of new population of hypotheses" called in step 2207 of FIG. 22.

FIG. 23 provides a control-flow diagram for the routine "generation of new population of hypotheses" called in step 2207 of FIG. 22. In step 2302, this routine receives a breeding population of hypotheses H. Then, in the while-loop of steps 2304-2311, this routine iteratively selects a new genetic-programming operation, or event, and applies that operation to one or more hypotheses selected from the breeding population of a hypotheses H to generate new hypotheses that are added back to the breeding population H. The next event is selected in step 2305, with the probability of selecting a crossover event less than that of selecting a mutation event. When the next event is a mutation event, as determined in step 2306, then a hypothesis and mutation for the hypothesis are selected based on probabilities of the occurrence of mutations, in step 2307, and the selected mutation is carried out in step 2308. Otherwise, two hypotheses are selected for a crossover event, in step 2309, which is carried out in step 2310 to generate two new candidate hypotheses. Again, as with the other described routines and methods, this breeding routine can be implemented in many different ways to produce alternative implementations. For example, in certain implementations, only candidate hypotheses generated by genetic operations are allowed into the new set of candidate hypotheses. The while-loop of steps 2304-2311 continues until a set of one or more termination conditions evaluates to FALSE. In certain implementations, the set of one or more termination conditions evaluates to FALSE when at least one of the termination conditions evaluates to FALSE. In other implementations, the set of one or more termination conditions evaluates to FALSE when at least a threshold number or percentage of the termination conditions evaluate to FALSE. These termination conditions may include one or more of generation of at least a threshold number of new hypotheses, expansion of the breeding population to at least a threshold number of hypotheses, carrying out at least a threshold number of genetic-programming operations, and other such termination conditions. The sense of the termination conditions may, in alternative implementations, specify termination when one or more termination conditions evaluate to TRUE.

Figure 24:
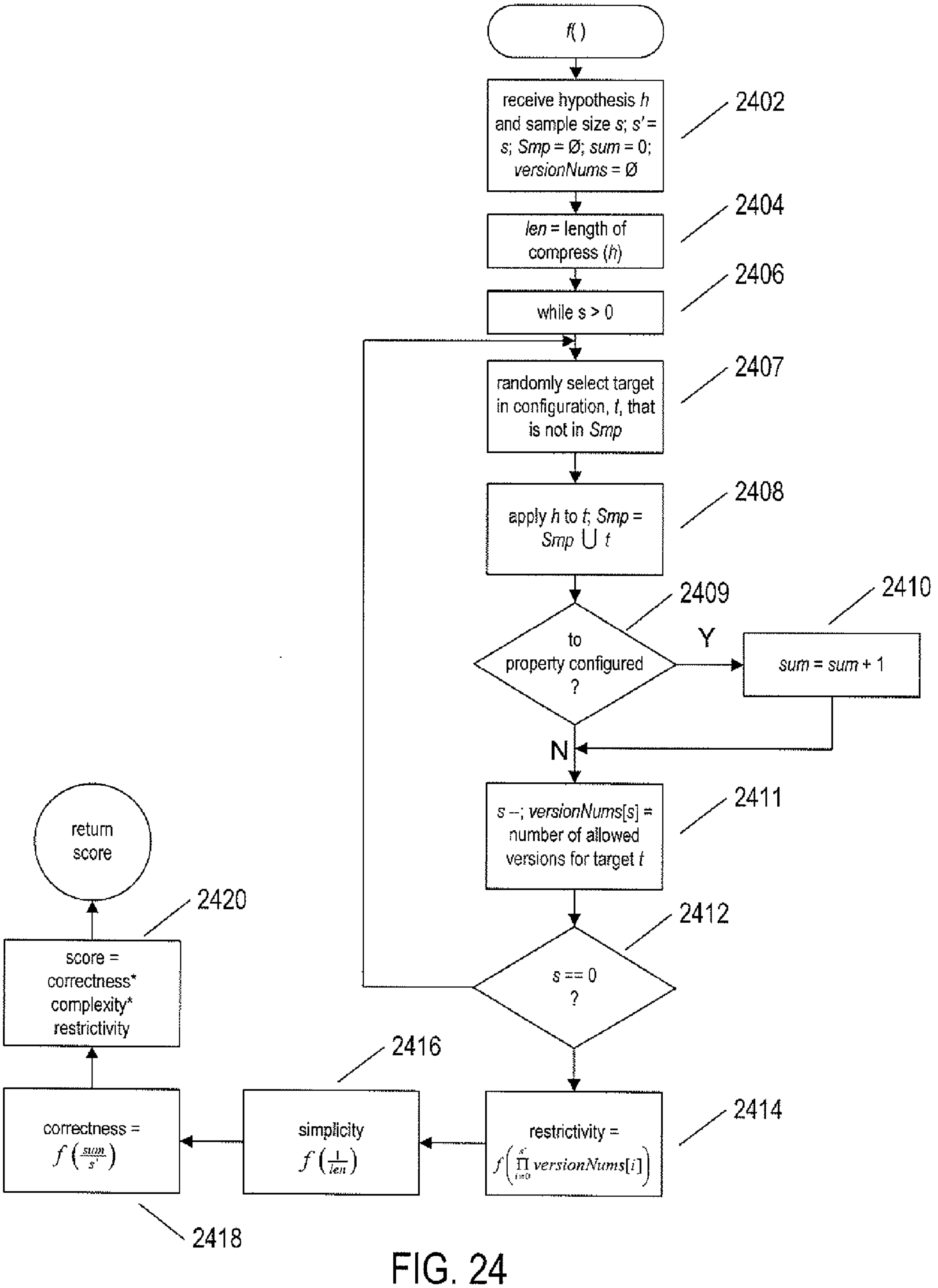
FIG. 24 provides a control-flow diagram for a scoring routine that computes the score or the fitness for a particular hypothesis.

FIG. 24 provides a control-flow diagram for a scoring routine that computes the score or the fitness for a particular hypothesis. This routine is called, as one example, in step 2110 of FIG. 21. In step 2402, the scoring routine receives a hypothesis h and a sample size s. The local variable s' is set to the value of s, the local set variable Smp is set to null, the local set variable versionNums is set to null, and the local variable sum is set to 0. Next, in step 2404, local variable len is set to the length of the compressed form of the hypothesis. Then, in the while-loop of steps 2406-2412, a next target component t is randomly selected, under the constraint the t is not already an element in the set Smp. Then, in step 2408, the hypothesis h is applied to t and t is added to the set Smp. When the hypothesis evaluates to indicate that t is properly configured, as determined in step 2409, then local variable sum is incremented in step 2410. In step 2411, local variable s is decremented, and the element of versionNums indexed by the current value of s is set to the number of allowed versions for the target t under hypothesis h. In step 2414, the restrictiveness of the hypothesis is computed as a function of the product of all the values stored in the array versionNums. The product represents an estimate of the number of configurations allowed by the hypothesis in the case that the sample size s is equal to the number of targets within the complex system. Then, in step 2416, a simplicity factor is computed for the hypothesis as a function of the reciprocal of the length of the compressed hypothesis. In step 2418, a correctness metric is computed for the hypothesis as a function of the ratio of the local variable sum over the local variable s'. Finally, in step 2420, a score is computed for the hypothesis as the product of the correctness metric, complexity metric, and restrictiveness metric. In steps 2414, 2416, and 2418, the metrics are computed as functions of values to indicate that, in certain implementations, a more complex calculation may be made. As one example, a restrictiveness metric may be normalized to take into account the relative sample size. The score may be computed based on random sampling of targets within a configuration, rather than based on all of the targets in the configuration, for the sake of efficiency and, most particularly, to allow for scaling of the hypothesis-generation approach to large complex systems.

FIGS. 25A-D and 26 illustrate a second, different implementation of the scoring or fitness function $f(\ )$ discussed above with reference to FIG. 24. The second implementation is based on Bayesian probability and the score computed by the second implementation of the scoring or fitness function is an estimate of the probability that a candidate hypothesis H is a correct hypothesis for explaining a configuration given the configuration data C.

Figure 25A:
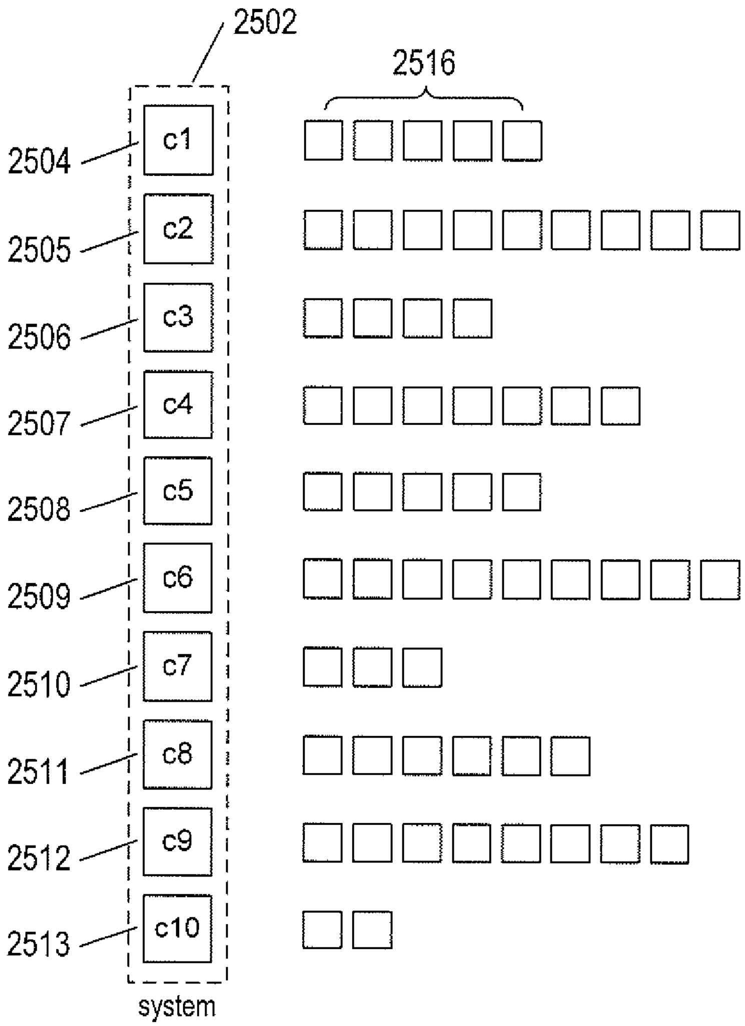
FIGS. 25A-D illustrate determination of an estimate of the probability that a configuration C will be observed given that a particular hypothesis H is true, P(C|H).

FIGS. 25A-D illustrate determination of an estimate of the probability that a configuration C will be observed given that a particular hypothesis H is true, P(C|H). In FIG. 25A, a system 2502 is abstractly illustrated as a set of 10 different components: c1 2504, c2 2505, c3 2506, c4 2507, c5 2708, c6 2509, c7 2510, c8 2511, c9 2512, and c10 2513. As also shown in FIG. 25A, each component is associated with some number of possible versions. For example, c1 2504 is associated with five possible versions 2516, each version represented by small squares.

At the bottom of FIG. 25A, a premise 2518 and an assumption 2520 are provided. Note that, as in the previous examples, the system configuration in the current example involves only the particular version associated with each version-associated component and subcomponent of the system, and the configuration data consist of the version associated with each target component in the system at a given point in time. An underlying premise for the approach illustrated in FIGS. 25A-D is that any observed configuration of a system is most likely close to being in accordance with, or conforming to, some set of configuration rules, principles, or policies that have been developed for the system by one or more system administrators and/or other such individuals. In the current example, it is assumed that 90 percent of the target components within the system, where target components are components associated with versions, have a version in compliance with the rules and policies for the system. In essence, the premise, simply stated, is that systems are generally kept in relatively close compliance with the configuration rules established for the system. The assumption shown in FIG. 25A, used to compute the probability of a hypothesis being correct given a set of configuration data, is that the probability that any particular target component a is in compliance with the rules and policies for the system, collectively referred to as a hypothesis H, is independent of the probability that any other target component b is in compliance with H. Clearly, for complex systems, the independence of the probabilities of compliance of any two different components may not hold. As one example, when certain target components are subcomponents of a larger, higher-level component, and that higher-level component has been recently replaced, it is often the case that all of the subcomponents are associated with the latest versions available for those subcomponents. Nevertheless, the assumption that the probabilities of compliance of different components are independent may apply generally within a complex system and, even when not strictly true, does not result in deleterious errors in the estimation of the probability of observing a particular configuration given that a particular hypothesis correctly expresses the rules and policies for the complex system.

Figure 25B:
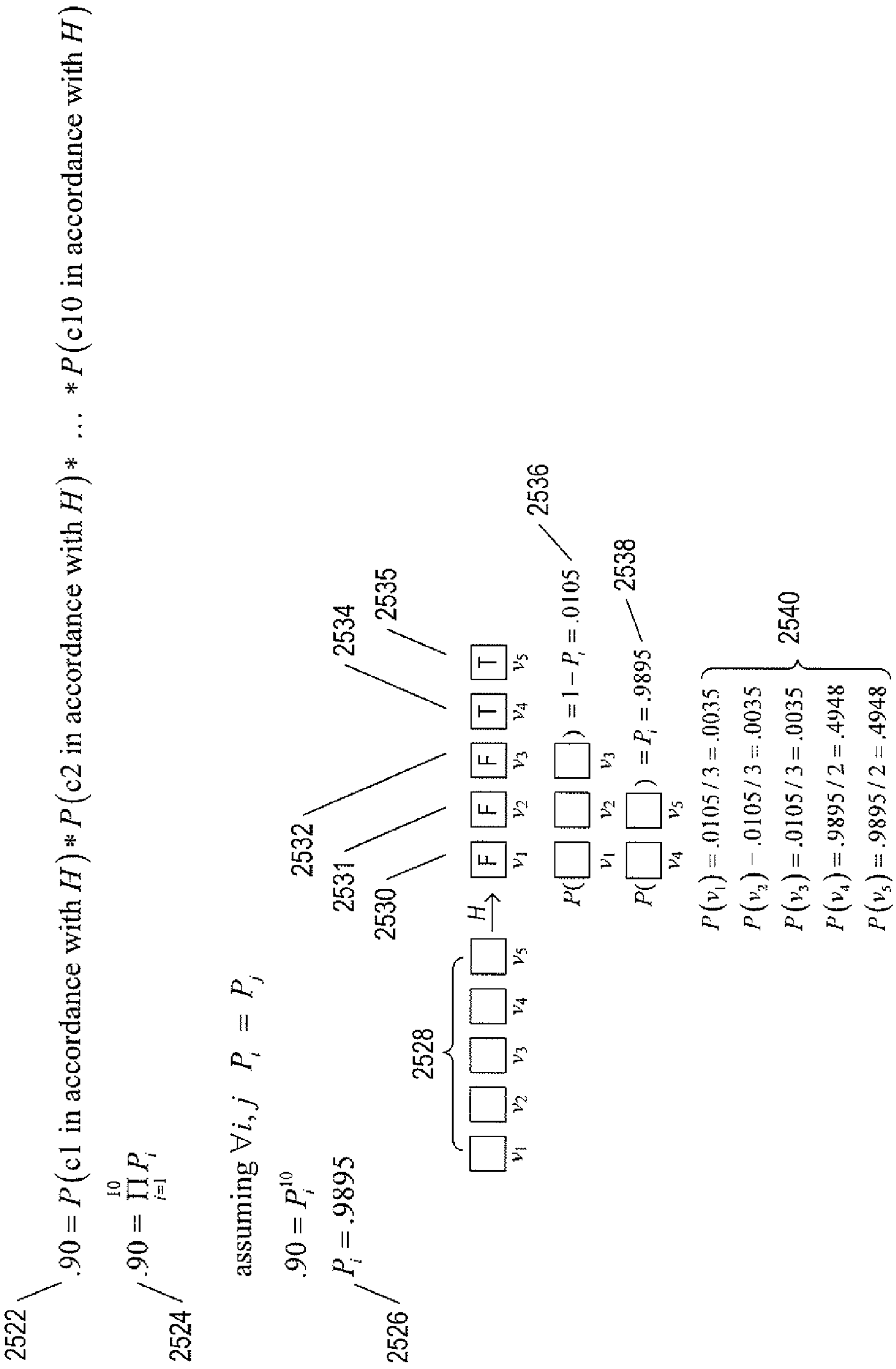

As shown in FIG. 25B, the premise 2518 and the assumption 2520 shown in FIG. 25A can be restated as expression 2522 in FIG. 25B. This expression stands for the proposition that the product of all of the individual probabilities that the various components have versions in compliance with a particular hypothesis H is equal to 0.90, or 90 percent. A further assuming that the probabilities of all the target components being in conformance with the hypothesis H are identical produces expression 2524. From this expression, the probability $P_i$ that the version of a particular target component i observed in the configuration data is in compliance with a valid hypothesis for the complex system is 0.9895 (2526 in FIG. 25B). This type of calculation allows assignment, to each possible version of a target component, of a corresponding probability value, These probabilities for the possible versions of a target component together comprise a kind of probability distribution over the possible versions. For example, when a target component has five possible versions 2528, and, under the hypothesis H, three of the versions would evaluate to FALSE or, in other words, represent versions not in compliance with H 2530-2532, and two of the versions 2533-2534 would be in compliance with hypothesis H, the probability that any of the non-complying versions would be observed given that hypothesis H accurately describes the configuration of the system can be computed as $1-P_1=0.0105$ (2536 in FIG. 25B). The probability that either of the versions that do conform with hypothesis H would be observed in the configuration data is equal to $P_i$ or 0.9895 (2538 in FIG. 25B). Finally, these aggregate probabilities for non-conforming and conforming versions can be distributed over the individual members of each of these two sets to produce a probability for each version 2540. Thus, as one example, when hypothesis H correctly describes the configuration of a complex system, then the probability of observing version $V_5$ associated with the target having the 5 versions 2528 in FIG. 25B in the configuration data is 0.4948.

The Bayesian formulation for the probability determination used in the alternative implementation of the scoring or fitness function is:

$$P(H|C)=[P(C|H)*P(H)]/P(C),$$

where H is a hypothesis and C is the configuration data. In essence, the probability that a particular hypothesis H is correct given configuration data C is equal to the probability of observing configuration data C given H times the probability that H is a correct hypothesis divided by the probability of observing configuration C. To solve this expression, it is assumed that P(C) is 1.0, since C is the observed configuration data. Under this assumption, the above expression simplifies to:

$$P(H|C)=[P(C|H)*P(H)].$$

The probability of observing a configuration C given hypothesis H can be computed from the individual probabilities of observing the particular versions associated with target components in the configuration data given a hypothesis H, as discussed above with reference to FIGS. 25A-B. The method discussed above with reference to FIGS. 25A-B can be expressed as:

$$P(H|C)=P(t_1=v_1|H)*P(t_2=v_2|H)* \ldots P(t_n=v_n|H)$$

where $t_1, t_2, \ldots, t_n$ are n target components; and $v_1, v_2, \ldots, v_n$ are the observed n versions of the n target components.

Using the above expression, the initial expression can be re-expressed as:

$$P(H|C)=P(t_1=v_1|H)*P(t_2=v_2|H)* \ldots P(t_n=v_n|H)*P(H)$$

Taking the logarithms of both sides produces:

$$\begin{aligned}\log[P(H \mid C)] = \log[P(t_1 = v_1 \mid H)] + \\ \log[P(t_2 = v_2 \mid H)] + \\ \vdots \\ \log[P(t_n = v_n \mid H)] + \\ \log[P(H)].\end{aligned}$$

Finally, the log of the probability that a hypothesis is correct, log [P(H)] is estimated as the negative of the length of the hypothesis, −length(H). This produces the final result:

$$\begin{aligned}\log[P(H \mid C)] = \log[PDT(t_1, v_1)] + \\ \log[PDT(t_2, v_2)] + \\ \vdots \\ \log[PDT(t_n, v_n)] - \\ \text{length}[H].\end{aligned}$$

Figure 25C:
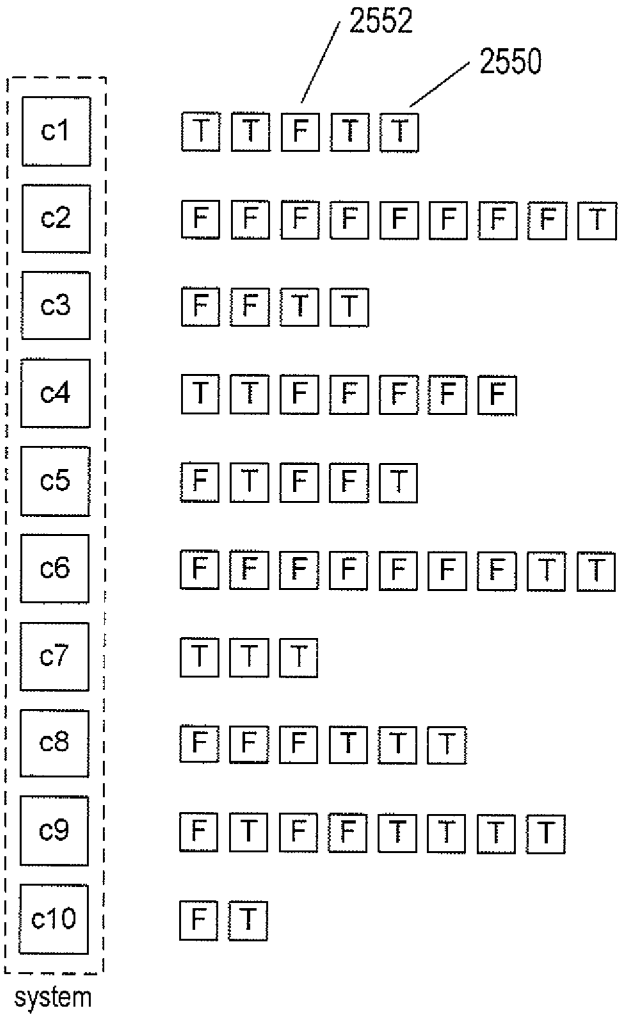
Figure 25D:
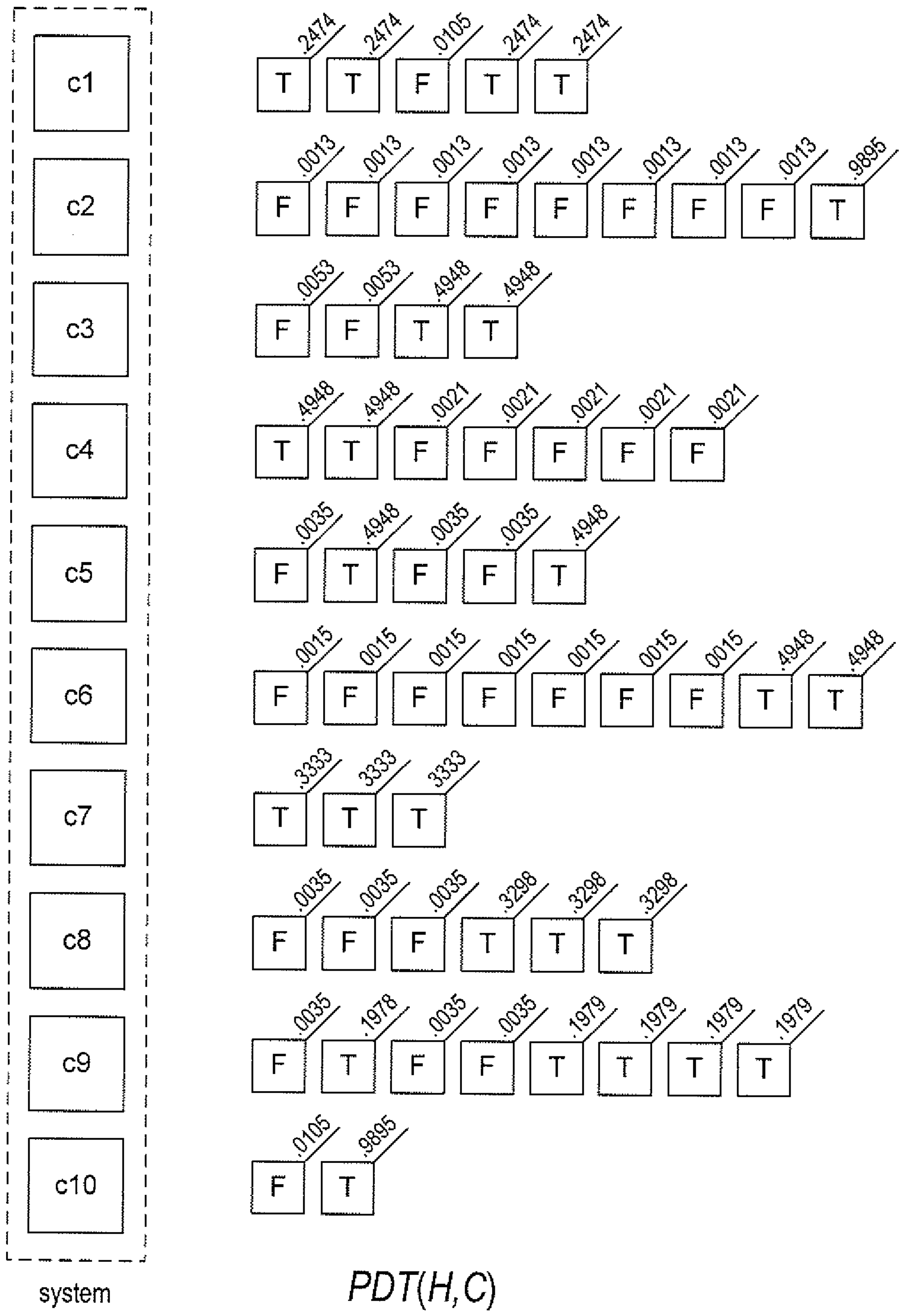

Continuing with the example shown in FIG. 25A, FIG. 25C shows the system following application of a hypothesis H to determine which versions of each of the components are allowed under the hypothesis and which versions are not allowed. The allowed components are marked with the symbol "T" and the disallowed symbols are labeled with the symbol "F." Another way of looking at this is that a version, such as version 2550 in FIG. 25C, labeled with symbol "T" would cause the hypothesis to evaluate to TRUE given that all other target components are associated with allowed versions. By contrast, a version, such as version 2552, labeled with symbol "F" would cause the hypothesis to evaluate to FALSE even though all other components are associated with allowable versions. Next, using the methods discussed above with reference to FIGS. 25A-B, probability distributions for each component can be calculated. This set of numeric probability distributions for each component is referred to, in the following, as the probability distribution table for hypothesis H and configuration data C, or "PDT(H,C)."

Figure 26:
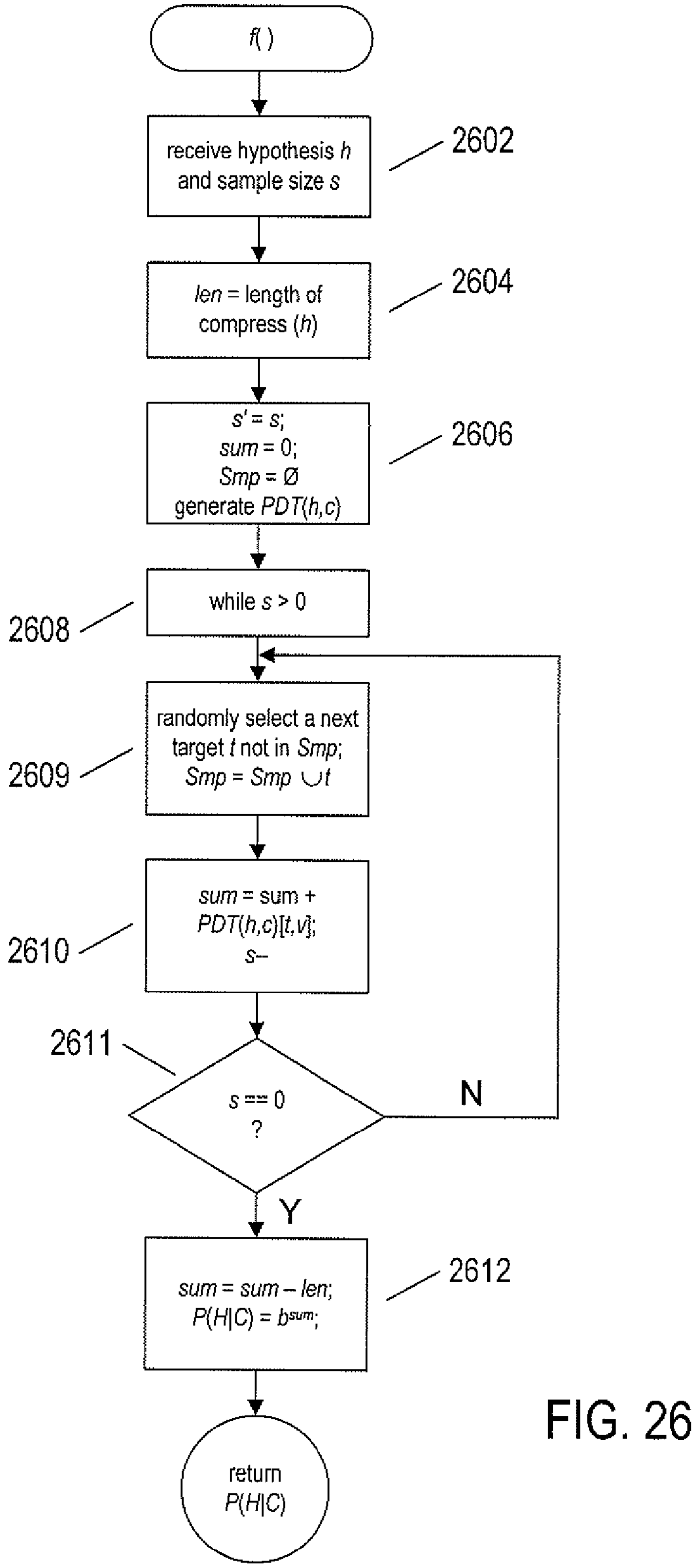
FIG. 26 provides a control-flow diagram for the alternate implementation of the scoring or fitness function $f(\,)$.

FIG. 26 provides a control-flow diagram for the alternate implementation of the scoring or fitness function ƒ( ). Many of the steps are identical to the steps shown in FIG. 24, and are therefore not again described, in the interest of brevity. Note that, steps 2602 and 2604 are identical and that step 2606 includes a new step of generating the probability distribution table for the received hypothesis. The while-loop of steps 2608-2611 is now somewhat simpler. The probabilities associated with each randomly selected target and the observed version for the target are simply extracted from the PDT and added to a local variable sum, in step 2610. In step 2612, the probability P(h|C) is computed as the anti-log of sum, where sum is the sum of the logarithms of all the individual probabilities of observing particular versions associated with particular components minus the length of the hypothesis h. In certain implementations, this final anti-log operation may be omitted, and the scoring or fitness function ƒ( ) can return the logarithm of P(C|h). Neither the probability nor the logarithm of the probability can be used as a constraint for steering the search of the space of possible hypothesis for the most desirable hypothesis. The probability P(h|C) embodies the above-discussed factors of accuracy, simplicity, and restrictiveness.

Addition Details Regard Hypothesis Scoring

The following discussion is related to scoring hypotheses based on their likelihood of being the underlying rule for a data center configuration. The only assumption made about a hypothesis is the hypothesis can be used to construct a decision procedure on the space of configurations or, in other words, a procedure for determining whether a configuration x is allowed or not allowed by the hypothesis.

A data center is modeled as a space of abstract targets. Here, a target is anything that has a version. A target can be a host machine, a hypervisor, a virtual machine running in that hypervisor, etc. The version space of a target is the set of all versions to which that target can be configured and is a function of the target's product. For example, two host computers of a particular type share a common version space. This leads to the following definitions:

I denotes the set of all products.

For each product i in I, $V_i$ is the set of all versions available for that product.

For each product i in I, $T_i$ is the set of all instances of that product in the data center.

The set T of every target in the data center and the complete version set ç, defined as follows, are considered:

$$T = \bigcup_{i \in I} T_i,$$

$$\varsigma = \bigcup_{i \in I} V_i.$$

A configuration of a data center is a valid version assignment for each target in the data center; formally, a configuration c maps each target t to a version of t's product. We consider the space C of all configurations $$C=\{c \epsilon V^T | R(c)\}|,$$

$$R(c) \equiv (\forall_i \epsilon I)(\forall t \epsilon T_i)(c(t) \epsilon v_i).$$

The predicate R is simply the restriction that c be valid (i.e. it only maps a target to versions of the product of which t is an instance). Now a system administrator will allow some configurations and not others according to the versioning rules he or she employs. Formally, a given rule r defines a decision function:

$$D_r:C\rightarrow\{\perp,T\}.$$

As a convenience we define the two families of sets $A_r$ and $N_r$ as $$A_r=\{c\in C|D_r(c)=T\},$$

$$Nr=\{c\in C|D_r(c)=\perp\}.$$

$A_r$ is the set of all configurations allowed by r and $N_r$ is the set of all configurations not allowed.

It may be desirable to make guesses as to what the center's versioning rules are. Such guesses are called hypotheses. Every rule defines a unique hypothesis and vice versa; for this reason we a hypothesis and the rule it defines are used interchangeably. One method that uses hypothesis scoring traverses the infinite space H of all hypothesis to find an optimal hypothesis. Hence, a quantity to optimize, one that reflects the likelihood that a hypothesis is the right one, needs to be identified. First consider a simple case wherein there is no information about the data center. To gauge the likelihood of a given hypothesis, a probability distribution function (pdf) is constructed over H. Define B as the set of all finite (possibly empty) binary strings:

$$B=\bigcup_{n\in\square}\{0,1\}^n$$

and a binary encoding scheme e for our hypotheses $$H\underset{e}{\square}B,$$

denoting that H is isomorphic to B under e. The binary encoding scheme e should preserve complexity: shorter hypotheses or very systematic hypotheses should be mapped to shorter binary sequences. A standard compression algorithm, such as Huffman or arithmetic encoding), accomplishes this with a few modifications to ensure that some hypothesis maps to each binary sequence. You can think of e(h) as being the minimal binary representation of h. The pdf is constructed with the assumption that system administrators favor simplicity, as follows:

$$l:H\rightarrow\square,$$

$$l(h)=|e(h)|,$$

$$(\forall\, h\in H)\ \ P(R=h)=\frac{1}{2^{2l(h)+1}},$$

where R=h is the event that the system administrator employs rule h. Note that l(h) is the length of the minimal binary representation of h (the Kolmogorov complexity). Next, P is verified as valid probability distribution. For distinct hypotheses $h_1$, $h_2$, the events $R=h_1$, $R=h_2$ are mutually exclusive: the system administrator is assumed to have one and only one rule (which can be very complex). Summing over all hypotheses:

$$\begin{aligned}\sum_{h\in H}P(R=h)&=\sum_{h\in H}\frac{1}{2^{2l(h)+1}}\\&=\sum_{h\in H}\frac{1}{2^{2|c(h)|}}\\&=\sum_{b\in B}\frac{1}{2^{2|e(e^{-1}(h))|+1}}\\&=\sum_{b\in B}\frac{1}{2^{2|b|+1}}\\&=\sum_{n\in\square}\frac{2^n}{2^{2n+1}}=\sum_{n\in\square}\frac{1}{2^{n+1}}=1.\end{aligned}$$

The fact the e is an isomorphism allows a change in the summation over each h in H to a summation of $e^{-1}(b)$ for each b in B. For each natural number n, there are exactly $2^n$ binary sequences of length n and they all have the exact same probability. In other words, the constant $$\frac{1}{2^{n+1}}$$

is distributed evenly over the sequences of length n.

Now the data center is sampled and it has an actual configuration c (denote this event by C=c). According to Bayes' theorem:

$$P(R=h\mid C=c)=\frac{P(C=c\mid R=h)P(R=h)}{P(C=c)}.$$

The probability P(C=c) can be removed; it is we assumed to be one as the configuration c has been observed. We have also already calculated P(R=h). A pdf for P(C=c|R=h) can be constructed so long as the distribution reflects the predictions about configurations that are made by the rule h. Consider the partition $A_h$, $N_h$, of allowed and not allowed configurations for h. Within either of these partitions there is no reason to favor one configuration over another, so the following scheme is proposed:

$$P(C=c\mid R=h)=\begin{cases}\frac{\gamma}{|A_h|}c\in A_h\\ \frac{1-\gamma}{|N_h|}c\in N_h\end{cases}.$$

The parameter $\gamma\in(0,1)$ is a conviction factor; it determines how much of the space between zero and one the pdf allocates for allowed configurations. The conviction factor $\gamma$ is not simply one. The distribution has to account for the fact that system administrators can accidentally deviate from their own rules. Were such oversights never to occur, there would be no purpose for a recommendation engine. Now, for each target t, define the random variable $E_t$ to be the version of that target. For example, in the case where there is a known configuration c:

$$(\forall t \in T) \quad P(Et = v \mid C = c) = \begin{cases} 1 & v = c(t) \\ 0 & \text{else} \end{cases}.$$

A target is said to be consistent with a configuration c if that target is set to the version specified by c (in other words, t is consistent with c if $E_t$=c(t). The data center has a configuration c if and only if every target in the data center is consistent with c.\, $$\left[\bigcap_{t \in T} (E_t = c(t))\right] = [C = c]$$

and consequently $$P\left[\bigcap_{t \in T} (E_t = c(t))\right] = P[C = c].$$

Taking some enumeration of the targets T={t1, t2 . . . , tn} and applying the chain rule, the conditional probability distribution is obtained:

$$P[C = c \mid R = h] = P\left[\bigcap_{t \in T} (E_t = c(t)) \,\middle|\, R = h\right] = \prod_{i=1}^{n} P\left[E_{ti} = c(ti) \,\middle|\, \bigcap_{j=i+1}^{n} E_{tj} = c(tj),\ R = h\right].$$

To calculate P ($E_t$=c(t)|H), iterate over all possible configurations in which target t has version c(t) and sum up their probabilities (consider the $n^{th}$ term in the product). For even trivial configuration spaces, this can become infeasible. Fortunately, the distribution we can be approximated relatively well.

Firstly, consider a hypothesis as no longer just a decision function on the configuration space but, instead, as an ordered pair h=(d,v), where d is a set of dependency rules and v is a set of versioning rules. It is intended that hypothesis syntax and encoding is unrestrictive. The dependencies d of a hypothesis should be statements of the form "newer machines' versions depend on older machines' versions" or "if t1 is t2's firewall, then t2's version depends on t1's version". However the only real requirements of d are that a dependency graph of the data center can be recovered from d and that such a graph is acyclic. The graph would have targets as vertices and dependencies as edges. The versioning rules v of a hypothesis are much like they have always been: declarative statements that relate properties of a target t and of other targets to the version of t. But to give meaning to d, a restriction is made that statements about a target t can only involve properties of targets on which t depends.

Given some target ti, find $$P\left[E_{ti} = c(ti) \,\middle|\, \bigcap_{j=i+1}^{n} E_{tj} = c(tj),\ R = h\right].$$

By taking the product of all such terms and multiplying by P(R=h), the expression P(R=h|C=c) is obtained. Using the dependency DAG (directed acyclic graph), targets T={t1, t 2 . . . , tn} can be enumerated such that if i>j then ti does not depend on tj. Target $t_1$ is a parent of $t_2$ if $t_2$ depends on $t_1$. Given the set $U_t$ of all parents of t, the formal restriction is made that, given the versions of t's parents, $E_t$ is independent of any other target's version, $$[\forall o \notin (U(t) \cup \{t\})](E_o \perp\!\!\!\perp E_t) \mid U_t, H,$$

where A ⊥⊥ B|C denotes that events A and B are conditionally independent given C. One way to interpret this statement is that, if the versions of all of t's dependents are given, more information is not gained about t if the versions of t's independents are given. Let $G_{c,t}$ be the event that every target excluding t is consistent with c, namely $$Gc,\ t = \bigcap_{u \in T} E_u = c(u).$$

Thanks to the careful enumeration, that target ti is known not to depend on any of its predecessors, so:

$$P\left[E_{ti} = c(ti) \,\middle|\, \bigcap_{j=i+1}^{n} E_{tj} = c(tj),\ R = h\right] = P\left[c(ti) \,\middle|\, \bigcap_{j=1}^{i-1} E_{tj} = c(tj),\ \bigcap_{j=i+}^{n} E_{tj} = c(tj),\ R = h\right] = \frac{P[E_t = c(t) \cap G_{c,i} \cap R = h]}{P[Gc,\ t \cap R = h]} = \frac{P[(E_t = c(t)) \cap G_{c,t} \mid R = h] \cdot P[R = h]}{P[Gc,\ t \mid R = h] \cdot P[R = h]} = \frac{P(C = c \mid R = h)}{P(G_{c,t} \mid R = h)}.$$

The outcome will differ depending on whether c is in $A_1$, or $N_I$,

Case c∈$A_h$:

$$\frac{P(C = c \mid R = h)}{P(G_{c,t} \mid R = h)} = \frac{\frac{\gamma}{|A_h|}}{\frac{\gamma}{|A_h|} \cdot \left|G_{c,t} \cap A_h\right| + \frac{1-\gamma}{N_h} \cdot \left|G_{c,t} \cap N_h\right|} = \frac{1}{\left|G_{c,t} \cap A_h\right| + \frac{1-\gamma}{N_h} \cdot \left|G_{c,t} \cap N_h\right|}.$$

Notice that this term is the same for every configuration that is in both $A_h$ and $G_{c,t}$, allowing the conclusion that, for any configuration d in $G_{c,t}$, $$P[(E_t = d(t)) \mid R = h] = \frac{\phi(h, c, t)}{|G_{c,t} \cap A_h|}$$

as a consequence of the fact that $G_{d,t}$=$G_{c,t}$ where $$\phi(h, c, t) = \frac{|G_{c,t} \cap A_h|}{|G_{c,t} \cap A_h| + \frac{A_h}{|\gamma|} \cdot \frac{1-\gamma}{N_h} \cdot |G_{c,t} \cap N_h|} = \frac{1}{1 + \frac{A_h}{|\gamma|} \cdot \frac{1-\gamma}{N_h} \cdot \frac{|G_{c,t} \cap N_h|}{|G_{c,t} \cap A_h|}}.$$

Now, from the space of configurations C, uniformly and randomly select a configuration k. The following can then be deduced, $$P(k \in A_h) = \frac{|A_h|}{|C|},$$

$$P(k \in N_h) = \frac{|N_h|}{|C|},$$

$$P(k \in G_{c,t} \cap A_h) = P(k \in G_{c,t} \mid k \in A_h)P(k \in A_h),$$

$$P(k \in G_{c,t} \cap N_h) = P(k \in G_{c,t} \mid k \in N_h)P(k \in N_h),$$

$$|G_{c,t} \cap A_h| = P(k \in G_{c,t} \cap A_h) \cdot |C|,$$

$$|G_{c,t} \cap N_h| = P(k \in G_{c,t} \cap N_h) \cdot |C|,$$

from which it can be derived that $$\begin{aligned}\phi(h, c, t) &= \frac{1}{1 + \frac{|A_h|}{\gamma} \cdot \frac{1-\gamma}{|N_h|} \cdot \frac{P(k \in G_{c,t} \cap N_h) \cdot |C|}{P(k \in G_{c,t} \cap A_h) \cdot |C|}} \\ &= \frac{1}{1 + \frac{|A_h|}{\gamma} \cdot \frac{1-\gamma}{|N_h|} \cdot \frac{P(k \in G_{c,t} \mid k \in N_h)P(k \in N_h)}{P(k \in G_{c,t} \mid k \in A_h)P(k \in A_h)}} \\ &= \frac{1}{1 + \frac{|A_h|}{\gamma} \cdot \frac{1-\gamma}{|N_h|} \cdot \frac{P(k \in G_{c,t} \mid k \in N_h)|N_h|}{P(k \in G_{c,t} \mid k \in A_h)|A_h|}} \\ &= \frac{1}{1 + \frac{1-\gamma}{\gamma} \cdot \frac{P(k \in G_{c,t} \mid k \in N_h)}{P(k \in G_{c,t} \mid k \in A_h)}}.\end{aligned}$$

In the limiting case where $\gamma$ approaches one, note that $\phi(h,c,t)$ also approaches one. This can be approximated with a reasonably high constant $$\phi(h,c,t) \approx 1-\delta.$$

Case $c \notin A_h$:

By symmetry, the probability is the same for all values of c and of the form $$P[(E_t = d(t)) \mid R = h] = \frac{\psi(h, c, t)}{|G_{c,t} \cap N_h|},$$

and to be consistent with our above approximation, it can be stated that $$\psi(h,c,t) = \delta.$$

In conclusion, the following tractable method is proposed for scoring hypotheses. Notice that the score is an approximation to the probability that the hypothesis is correct in accordance with Bayes' theorem. In the method, probabilities are encoded as negative real numbers representing the logarithm of a number from zero to one. This is done partially because it allows for adding the constituent terms of the expression, which is less expensive time-wise, $$\log\left[P(H)\prod_{i=1}^{n} P\left[E_{ti} = c(ti) \,\middle|\, \bigcap_{j=i+1}^{n} E_{tj} = c(tj),\, R = h\right]\right] = \log P(H) + \sum_{i=1}^{n} P\left[E_{ti} = c(ti) \,\middle|\, \bigcap_{j=i+1}^{n} E_{tj} = c(tj),\, R = h\right],$$

but more importantly, to avoid floating-point precision errors. The method is shown in pseudocode, below:

```
function score (h)
  score ← −2 · complexity (h) − 1
  for t = [t1, t2, . . . , tn]
    A ← { }
    N ← { }
    actual ← t.version
    for v in version(t)
      t.version ← v
      if evaluate(h)
        A ← AU{v}
      else
        N ← NU{v}
      t.version ← actual
      if t.version ∈ A
        score ← score + log((1 − δ)/|A|)
      else
        score ← score + log(δ/|N|)
    return score
```

The initial probability of h is $$\frac{1}{2^{2 \cdot l(h)+1}},$$

where l(h) is the length of the minimal binary representation of h, or the Kolmogorov complexity. Taking the logarithm (assume all logarithms are base 2) gives an initial score for the hypothesis $$\log \frac{1}{2^{l(h)+1}} = -2 \cdot l(h) - 1.$$

Although the present invention has been described in terms of particular embodiments, it is not intended that the invention be limited to these embodiments. Modifications within the spirit of the invention will be apparent to those skilled in the art. For example, any number of various implementation and design parameters can be varied to produce alternative implementations of the currently disclosed method and system, including modular organization, programming language, operating system, hardware platform, data structures, control structures, and other such parameters. Any of many different approaches to genetic programming, simulated annealing, scoring, and other component functionality of the currently disclosed methods and systems may be employed in alternative embodiments.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system that generates a configuration-hypothesis for a subject complex system that includes a number of components, the system comprising:

one or more processors, one or more data-storage devices, including an electronic memory;

observed configuration data for the subject complex system stored in one or more of the one or more data-storage devices; and computer instructions stored in one or more of the one or more data-storage devices that control the system to generate a set of initial candidate hypotheses and store the initial candidate hypotheses in a data-storage device as a current set of candidate hypotheses, each hypothesis representing a logic-based explanation of the observed configuration data for a number of target components less than or equal to the number of components, iteratively generate a new set of candidate hypotheses from the current set of hypotheses, select, from the new set of candidate hypotheses, a set of selected hypotheses based on a score assigned by a scoring function to each hypotheses in the new set of candidate hypotheses, and store the selected hypotheses in the data-storage device as the current set of candidate hypotheses, select, based on a score assigned by a scoring function to each hypotheses in the current set of hypotheses, a final hypothesis that describes the observed configuration data, and store the selected final hypothesis in one of the one or more data-storage devices.

2. The system of claim 1 wherein the configuration data includes one or more numerical or textural values for each of the target components of the complex system; and wherein a hypothesis is expressed in one of first-order predicate logic, a hypothesis language based on first-order predicate logic, a programming language based on first-order predicate logic, a higher-order predicate logic, a hypothesis language based on a higher-order predicate logic, a programming language based on a higher-order predicate logic, a procedural programming language, a specialized hypothesis language.

3. The system of claim 2 wherein a hypothesis is evaluated by the system to a true or false value with respect to observed configuration data for the subject complex system and wherein the system can additionally evaluate the hypothesis as true or false with respect to a particular target component by assuming that observed configuration data for the remaining target components comply with the hypothesis.

4. The system of claim 1 wherein the computer instructions control the system to generate the set of initial hypotheses and store the initial hypotheses in the data-storage device as the current set of candidate hypotheses by one or more of:

randomly generating one or more hypotheses that each can be evaluated by the system to a true or false value with respect to the observed configuration data for the subject complex system as well as with respect to a particular target component; and generating candidate hypotheses, including one or more of a hypothesis that states that each component is configured to have a configuration encoded for that target component in the observed configuration data, and a hypothesis that states that each target component has a version equal to the most recent version available for that target component.

5. The system of claim 1 wherein the computer instructions control the system to generate a new set of candidate hypotheses from the current set of hypotheses by:

iteratively selecting a next genetic operation, and performing the selected genetic operation to produce one or more new hypotheses, until one or a set of one or more termination conditions evaluates to a value that indicates that no further genetic operations are to be applied.

6. The system of claim 5 wherein no further genetic operations are to be applied when one or more of the following conditions occur:

a threshold number of genetic operations have been carried out; and a threshold number of new hypotheses have been carried out.

7. The system of claim 5 wherein performing the selected genetic operation to produce one or more new hypotheses further comprises:

generating a syntax tree for one or more hypotheses selected from the current set of hypotheses;

performing the selected genetic operation to produce one or more new syntax trees; and applying one of optimization and state-space search to select optimal or near-optimal values for leaf nodes of the one or more new syntax trees.

8. The system of claim 7 wherein genetic operations include:

mutation operations that operate on a syntax tree corresponding to a hypothesis to generate a new, mutated hypothesis; and crossover operations that operate on two syntax trees corresponding to two hypotheses to generate two new hypotheses.

9. The system of claim 7 wherein the one of optimization and state-space search further comprises simulated annealing.

10. The system of claim 1 wherein the scoring function assigns a score to a hypothesis based on a determined accuracy of the hypothesis in explaining the observed configuration data, a determined restrictiveness of the hypothesis, and a simplicity of the hypothesis.

11. The system of claim 10 wherein the accuracy is determined as the ratio of target components with configurations encoded in the observed configuration data that are explained by the hypotheses to a total number of target components.

12. The system of claim 10 wherein the restrictiveness is determined based on a number of different configurations of the target components allowed by the hypothesis.

13. The system of claim 10 wherein the simplicity is determined based on the length of a minimum-length or near-minimum-length symbolic representation of the hypothesis.

14. The system of claim 1 wherein the scoring function assigns a score to a hypothesis based on a determined probability of the hypothesis given the observed configuration data.

15. The system of claim 14 wherein the probability of the hypothesis given the observed configuration data is determined as a product of the probability of the observed configuration data given the hypothesis and a probability of the hypothesis.

16. The system of claim 15 wherein the probability of the hypothesis is related to the length of a minimum-length or near-minimum-length symbolic representation of the hypothesis.

17. The system of claim 15 wherein the probability of the observed configuration data given the hypothesis is a product of the probabilities of each target component having an observed configuration encoded in the observed configuration data.

18. A method that generates a configuration-hypothesis for a subject complex system that includes a number of components, the method carried out in a system having one or more processors, one or more data-storage devices, including an electronic memory, observed configuration data for the subject complex system stored in one or more of the one or more data-storage devices, and computer instructions stored in one or more of the one or more data-storage devices that control the system, the method comprising:
- generating a set of initial candidate hypotheses and storing the initial candidate hypotheses in a data-storage device as a current set of candidate hypotheses, each hypothesis representing a logic-based explanation of the observed configuration data for a number of target components less than or equal to the number of components;
- iteratively
  - generating a new set of candidate hypotheses from the current set of hypotheses,
  - selecting, from the new set of candidate hypotheses, a set of selected hypotheses based on a score assigned by a scoring function to each hypotheses in the new set of candidate hypotheses, and
  - storing the selected hypotheses in the data-storage device as the current set of candidate hypotheses;
- selecting, based on a score assigned by a scoring function to each hypotheses in the current set of hypotheses, a final hypothesis that describes the observed configuration data, and
- storing the selected final hypothesis in one of the one or more data-storage devices.

19. The method of claim 18
- wherein the configuration data includes one or more numerical or textural values for each of the target components of the complex system; and
- wherein a hypothesis is expressed in one of
  - first-order predicate logic,
  - a hypothesis language based on first-order predicate logic,
  - a programming language based on first-order predicate logic,
  - a higher-order predicate logic,
  - a hypothesis language based on a higher-order predicate logic,
  - a programming language based on a higher-order predicate logic,
  - a procedural programming language,
  - a specialized hypothesis language.

20. The method of claim 18 wherein the computer instructions control the system to generate a new set of candidate hypotheses from the current set of hypotheses by:
- iteratively
  - selecting a next genetic operation, and
  - performing the selected genetic operation to produce one or more new hypotheses,
- until one or a set of one or more termination conditions evaluates to a value that indicates that no further genetic operations are to be applied.

* * * * *